United States Patent
Sato

(10) Patent No.: US 10,023,230 B2
(45) Date of Patent: Jul. 17, 2018

(54) DRIVE ASSIST DEVICE, AND DRIVE ASSIST METHOD

(71) Applicant: Minami Sato, Susono (JP)

(72) Inventor: Minami Sato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/438,099

(22) PCT Filed: Nov. 29, 2012

(86) PCT No.: PCT/JP2012/080911
§ 371 (c)(1),
(2) Date: Apr. 23, 2015

(87) PCT Pub. No.: WO2014/083649
PCT Pub. Date: Jun. 5, 2014

(65) Prior Publication Data
US 2015/0291216 A1    Oct. 15, 2015

(51) Int. Cl.
*B60W 50/14* (2012.01)
*B62D 15/02* (2006.01)
*B60W 30/12* (2006.01)
*B60W 30/09* (2012.01)
*B60W 30/095* (2012.01)
(Continued)

(52) U.S. Cl.
CPC ......... *B62D 15/0265* (2013.01); *B60W 30/08* (2013.01); *B60W 30/09* (2013.01); *B60W 30/0956* (2013.01); *B60W 30/12* (2013.01); *B60W 50/14* (2013.01); *B62D 15/025* (2013.01); *B60W 10/20* (2013.01); *B60W 2710/18* (2013.01); *B60W 2710/20* (2013.01)

(58) Field of Classification Search
None
See application file for complete search history.

(56) References Cited

U.S. PATENT DOCUMENTS 6,185,492 B1    2/2001   Kagawa et al.
6,624,782 B2 *  9/2003   Jocoy ................... G01S 13/931
                                                342/195
(Continued)

FOREIGN PATENT DOCUMENTS

JP    11-105728 A    4/1999
JP    11227624 A     8/1999
(Continued)

OTHER PUBLICATIONS

International Search Report for PCT/JP2012/080911 dated Mar. 5, 2013 [PCT/ISA/210].

*Primary Examiner* — Truc M Do
(74) *Attorney, Agent, or Firm* — Sughrue Mion, PLLC

(57) ABSTRACT

A driving assisting section includes a collision avoidance assisting section, which performs collision avoidance assistance for avoiding collision between a vehicle to be assisted and an object by prompting turning of the vehicle. The driving assisting section further includes a lane-keeping assisting section, which performs lane keeping assistance. An assist arbitrating section arbitrates between the collision avoidance assistance by the collision avoidance assisting section and the lane keeping assistance by the lane-keeping assisting section.

14 Claims, 22 Drawing Sheets

(51) Int. Cl.
  *B60W 30/08*  (2012.01)
  *B60W 10/20*  (2006.01)

(56) References Cited

U.S. PATENT DOCUMENTS

| | | | | |
|---|---|---|---|---|
| 8,788,176 B1* | 7/2014 | Yopp | B60W 30/095 | 701/300 |
| 8,818,042 B2* | 8/2014 | Schofield | G06K 9/00818 | 348/211.3 |
| 9,026,352 B2* | 5/2015 | Shimizu | G08G 1/166 | 701/301 |
| 9,050,980 B2* | 6/2015 | Dariush | B60W 50/0098 | |
| 9,342,986 B2* | 5/2016 | Dariush | G08G 1/166 | |
| 9,505,411 B2* | 11/2016 | Kobana | B60W 50/12 | |
| 9,682,703 B2* | 6/2017 | Okita | B60T 8/17558 | |
| 9,707,973 B2* | 7/2017 | Kobana | B60W 50/12 | |
| 2004/0181339 A1 | 9/2004 | Mukaiyama | | |
| 2005/0203705 A1* | 9/2005 | Izumi | B60T 7/22 | 701/301 |
| 2007/0106475 A1* | 5/2007 | Kondoh | B60K 26/021 | 701/301 |
| 2007/0112514 A1* | 5/2007 | Ekmark | G08G 1/161 | 701/301 |
| 2007/0288133 A1* | 12/2007 | Nishira | G05D 1/0214 | 701/23 |
| 2008/0097699 A1* | 4/2008 | Ono | B60R 21/0134 | 701/300 |
| 2008/0208408 A1* | 8/2008 | Arbitmann | B60W 10/06 | 701/41 |
| 2008/0281521 A1* | 11/2008 | Shirato | B60T 7/22 | 701/301 |
| 2009/0228174 A1* | 9/2009 | Takagi | B60T 8/17558 | 701/41 |
| 2010/0042323 A1* | 2/2010 | Harada | B60R 21/0134 | 701/300 |
| 2010/0063735 A1* | 3/2010 | Kindo | B60W 40/072 | 701/300 |
| 2011/0022317 A1* | 1/2011 | Okita | B60W 30/12 | 701/301 |
| 2011/0082623 A1* | 4/2011 | Lu | B60W 10/06 | 701/41 |
| 2011/0245992 A1* | 10/2011 | Stahlin | B60W 50/085 | 701/1 |
| 2011/0254699 A1* | 10/2011 | Sugawara | G08G 1/164 | 340/901 |
| 2011/0276227 A1* | 11/2011 | Sugawara | B60T 7/042 | 701/41 |
| 2012/0083947 A1* | 4/2012 | Anderson | B60W 30/09 | 701/3 |
| 2012/0101701 A1* | 4/2012 | Moshchuk | B60W 10/184 | 701/70 |
| 2012/0101713 A1* | 4/2012 | Moshchuk | B60W 10/184 | 701/301 |
| 2012/0116663 A1* | 5/2012 | Tsunekawa | G08G 1/166 | 701/300 |
| 2012/0161980 A1* | 6/2012 | Bonne | B60W 30/09 | 340/905 |
| 2012/0330541 A1* | 12/2012 | Sakugawa | G08G 1/166 | 701/301 |
| 2013/0179047 A1* | 7/2013 | Miller | B60W 30/09 | 701/70 |
| 2013/0311043 A1* | 11/2013 | Kobana | B60J 7/22 | 701/41 |

FOREIGN PATENT DOCUMENTS

| | | |
|---|---|---|
| JP | 2004-276732 A | 10/2004 |
| JP | 2005-310011 A | 11/2005 |
| JP | 2007-210505 A | 8/2007 |
| JP | 2008-120288 A | 5/2008 |
| JP | 2009-104226 A | 5/2009 |
| JP | 2011-022884 A | 2/2011 |
| JP | 2011-051570 A | 3/2011 |

* cited by examiner

DRIVE ASSIST DEVICE, AND DRIVE ASSIST METHOD

CROSS REFERENCE TO RELATED APPLICATIONS

This application is a National Stage of International Application No. PCT/JP2012/080911 filed Nov. 29, 2012, the contents of all of which are incorporated herein by reference in their entirety.

FIELD OF THE DISCLOSURE

The present invention relates to a driving assistance apparatus that assists in driving a vehicle and also relates to a driving assistance method.

BACKGROUND OF THE DISCLOSURE

In general, a driving assistance apparatus that assists in driving a vehicle uses an on-vehicle camera and a navigation system to obtain traffic information on a street crossing, a stop position, a curve, and approach of vehicles ahead, which require control of deceleration of the vehicle. Based on the thus obtained traffic information in the vicinity of vehicles, driving assistance such as guidance for deceleration by sound or deceleration assistance by providing braking force in a semi-compulsory manner is performed.

Further, for example, Patent Document 1 discloses a driving assistance apparatus (vehicle-steering control device) that performs lane keeping assist (LKAS), which is assistance for suppressing the traveling position of the vehicle from veering from a lane. This apparatus recognizes the road lane on which a vehicle of an assistance target travels, thereby setting up a target traveling line based on the thus recognized lane. The apparatus monitors whether the traveling line of the vehicle veers from the setup target traveling line and provides a steering torque to the steering system for matching the traveling line of the vehicle with the target traveling line when the traveling line of the vehicle veers from the target traveling line.

PRIOR ART DOCUMENTS

Patent Documents

Patent Document 1: Japanese Laid-Open Patent Publication No. 11-105728

SUMMARY OF THE INVENTION

Problems that the Invention is to Solve

In recent vehicles, due to availability of multiple types of driving assistance, a plurality of types of driving assistance is often performed. As apparatuses that perform the above-described driving assistance, for example, a driving assistance apparatus has been developed that performs collision avoidance assistance for avoiding collision between a vehicle that is an assistance target and objects such as other vehicles or pedestrians present in the vicinity by turning. In the collision avoidance assistance, upon detection of an object present ahead of a vehicle in the advancing direction, a collision probability between the object and the vehicle is determined. When the collision probability is determined to be high, in order to avoid collision and reduce the impact from such collision, a steering control device, a braking control device, a suspension control actuator, a seat belt actuator, a beeper, and a display are controlled. Further, when the collision probability between the vehicle and the object is high, a braking force is applied to prompt turning and deceleration of the vehicle, and the driver is warned.

On the other hand, a vehicle state that is changed by the turning and deceleration performed by the collision avoidance assistance does not necessarily match with a vehicle state that is changed by other types of driving assistance such as the above-described lane keeping assistance. Therefore, when the collision avoidance assistance is different from other types of driving assistance in a target state of the vehicle, there is a fear that the collision avoidance assistance may be decreased in the effects or that the collision avoidance assistance and other types of driving assistance may be performed repeatedly. This may cause the driver to experience a sense of discomfort.

The above-described problem is found not only in vehicles in which lane keeping assistance is performed, but also substantially common to vehicles in which collision avoidance assistance and other types of driving assistance are performed.

Accordingly, it is an objective of the present invention to provide a driving assistance apparatus capable of maintaining appropriateness of each type of driving assistance even in a vehicle in which a plurality of types of driving assistance are performed and also to provide a driving assistance method.

Means for Solving the Problems

Means for achieving the above objective and advantages thereof will now be discussed.

To achieve the foregoing objective, the present invention provides a driving assistance apparatus that assists in driving a vehicle. The apparatus includes a collision avoidance assisting section, which performs collision avoidance assistance for avoiding collision between a vehicle that is an assistance target and an object by prompting turning of the vehicle, and an assistance arbitration section, which performs arbitration between the collision avoidance assistance and driving assistance different in type from the collision avoidance assistance.

To achieve the foregoing objective, the present invention also provides a driving assistance method for assisting in driving a vehicle. The method includes: a collision avoidance step for performing collision avoidance assistance for avoiding collision between a vehicle that is an assistance target and an object; and an assistance arbitrating step for performing arbitration between the collision avoidance assistance and driving assistance different in type from the collision avoidance assistance.

In a vehicle to which the above-described configuration or the method is applied, a plurality of types of driving assistance such as collision avoidance assistance and driving assistance different in type from the collision avoidance assistance are performed. Moreover, when it is detected that the collision avoidance assistance and the driving assistance different in type from the collision avoidance assistance are performed at the time to interfere with each other, arbitration is performed between the collision avoidance assistance and the driving assistance different in type from the collision avoidance assistance. Thus, interference between the collision avoidance assistance and the driving assistance different in type from the collision avoidance assistance is suppressed. As a result, interference between the respective types of driving assistance or repeated performance of the plurality of types of driving assistance within a predetermined period of time is suppressed. Accordingly, even a vehicle in which multiple types of driving assistance are performed is able to maintain appropriateness of the respective types of driving assistance.

In accordance with one aspect of the present invention, the driving assistance different in type from the collision avoidance assistance is driving assistance for prompting turning of the assistance target vehicle. The assistance arbitration section suppresses the driving assistance different in type from the collision avoidance assistance when the collision avoidance assistance and the driving assistance different in type from the collision avoidance assistance prompt turning in conflicting directions.

In accordance with one aspect of the present invention, as the driving assistance different in type from the collision avoidance assistance, driving assistance for prompting turning of the assistance target vehicle is performed. In the assistance arbitrating step, when the collision avoidance assistance and the driving assistance different in type from the collision avoidance assistance prompt turning of the vehicle in conflicting directions, the driving assistance different in type from the collision avoidance assistance is suppressed.

As driving assistance, assistance for maintaining the vehicle state at a target vehicle state is often performed by prompting turning of a vehicle that is an assistance target. On the other hand, since this type of assistance and the above-described collision avoidance assistance are different in target vehicle state, there is a fear that they may perform turning in conflicting directions. When these types of assistance conflict in turning directions, there is a fear that the collision avoidance assistance may be decreased in effects or that the driver may have an increased sense of discomfort by alternate turning of the vehicle.

In this respect, according to the above-described configuration or the method, when turning in conflicting directions is prompted by the collision avoidance assistance and the driving assistance different in type from the collision avoidance assistance, the driving assistance different in type from the collision avoidance assistance is suppressed. Therefore, turning of the vehicle prompted by the collision avoidance assistance is suppressed from being cancelled by turning prompted by the driving assistance different in type from the collision avoidance assistance. Further, turning of the vehicle prompted by the collision avoidance assistance and the turning prompted by the driving assistance different in type from the collision avoidance assistance are suppressed from being performed alternately, by which turning in conflicting directions is also suppressed from being prompted alternately.

Further, since the collision avoidance assistance is performed to avoid collision between a vehicle that is an assistance target and an object, the collision avoidance assistance is particularly high in the order of importance among various types of driving assistance. In this respect, according to the above-described configuration or the method, the driving assistance different in type from the collision avoidance assistance is suppressed. As a result, when a request for activating the collision avoidance assistance and a request for activating the driving assistance different in type from the collision avoidance assistance are made, assistance for avoiding collision between the vehicle and an object is preferentially performed. Thereby, even when multiple types of driving assistance are performed for one vehicle, it is possible to favorably maintain assistance functions by the collision avoidance assistance.

In accordance with one aspect of the present invention, the assistance arbitration section suppresses the driving assistance different in type from the collision avoidance assistance in at least one of the following periods of time: a period of time from start of the collision avoidance assistance to termination of the collision avoidance assistance; a period of time after termination of the collision avoidance assistance until when setup time elapses; and a period of time during which a suppressing condition specified for the driving assistance different in type from the collision avoidance assistance is met.

According to the above-described configuration, in a period of time from start of the collision avoidance assistance to termination of the collision avoidance assistance, activation of the driving assistance different in type from the collision avoidance assistance is suppressed. Therefore, during performance of the collision avoidance assistance, the driving assistance different in type from the collision avoidance assistance is not performed. It is, thus, possible to suppress interference between these types of driving assistance due to simultaneous performance of the collision avoidance assistance, which is temporarily activated, and the driving assistance different in type from the collision avoidance assistance.

Further, according to the above-described configuration, in a period of time until the lapse of setup time after termination of the collision avoidance assistance, activation of the driving assistance different in type from the collision avoidance assistance is suppressed. Therefore, a vehicle state in which the collision avoidance assistance has been performed is maintained in a state that has been changed by the collision avoidance assistance during a period of time until the lapse of setup time. Accordingly, the vehicle state, which has been changed by the collision avoidance assistance, is maintained, by which effects of the collision avoidance assistance are maintained until the distance between the assistance target vehicle and an object present in the vicinity thereof is ensured to be equal to or longer than a predetermined distance. Further, multiple types of driving assistance are suppressed from being performed within a predetermined period of time by suppressing the driving assistance different in type from the collision avoidance assistance until the lapse of setup time. As a result, the vehicle state is prevented from being changed constantly and a sense of discomfort experienced by the driver is also suppressed.

Further, according to the above-described configuration, in the period of time during which a suppressing condition specified for the driving assistance different in type from the collision avoidance assistance has been met, activation of the driving assistance different in type from the collision avoidance assistance is suppressed. Therefore, as long as an arbitrarily setup suppressing condition is met, the driving assistance different in type from the collision avoidance assistance is not activated, and interference between a plurality of types of driving assistance is also suppressed. Further, accordingly, the collision avoidance assistance and the driving assistance different in type from the collision avoidance assistance are arbitrated by the arbitrarily set-up suppressing condition, thereby increasing the flexibility in arbitration.

Still further, the present invention is particularly effective when applied to a case where the driving assistance different in type from the collision avoidance assistance is driving assistance that prompts turning of a vehicle which is an assistance target. Accordingly, in each of the above-described periods of time, the collision avoidance assistance and the collision avoidance assistance different in type from the collision avoidance assistance, which prompt turning in the conflicting directions, are suppressed from being activated. As a result, in the above-described each period of time, it is possible to properly maintain the assistance advantages by the collision avoidance assistance.

Since the collision avoidance assistance is performed for avoiding collision between the assistance target vehicle and an object, it is particularly high in the order of importance among various types of driving assistance. In this respect, according to the above-described configuration, when the driving assistance different in type from the collision avoidance assistance is suppressed. Thus, when a request for activating the collision avoidance assistance and a request for activating the driving assistance different in type from the collision avoidance assistance are made, the assistance for avoiding collision between the assistance target vehicle and the object is preferentially performed. Thereby, even where multiple types of driving assistance are performed for one vehicle, it is possible to favorably maintain assistance functions by the collision avoidance assistance.

In accordance with one aspect of the present invention, the suppressing condition is met based on a prediction that a condition of activating the collision avoidance assistance due to performance of the driving assistance different in type from the collision avoidance assistance will be met.

The target vehicle state of the collision avoidance assistance does not necessarily match with the target vehicle state of the driving assistance different in type from the collision avoidance assistance. Therefore, when these types of driving assistance are mutually different in the target vehicle state, there is a fear that a change in the vehicle state due to performance of the driving assistance different in type from the collision avoidance assistance, for example, a change in the advancing direction or the traveling speed, will result in appearance of an object ahead of the vehicle after the change in the advancing direction or within a predetermined range or approach of the vehicle to the object after the change. Then, at this time, the vehicle state is changed by the driving assistance different in type from the collision avoidance assistance, by which a condition of activating the collision avoidance assistance that has not been met at the beginning is met and the collision avoidance assistance may be activated.

In this respect, according to the above-described configuration, when it is predicted that the condition of activating the collision avoidance assistance due to performance of the driving assistance different in type from the collision avoidance assistance will be met, the above-described suppressing condition is met to suppress activation of the driving assistance different in type from the collision avoidance assistance. Therefore, it is possible to suppress in advance the driving assistance different in type from the collision avoidance assistance from being a cause of activation of the collision avoidance assistance.

In accordance with one aspect of the present invention, the collision avoidance assistance includes assistance for performing intervention braking to the assistance target vehicle. The collision avoidance assistance based on an activation condition that is met by performance of the driving assistance different in type from the collision avoidance assistance is at least one of the assistance for performing the intervention braking and the assistance for prompting the turning of the assistance target vehicle.

Depending on the assistance content of the driving assistance different in type from the collision avoidance assistance, the assistance mode of the collision avoidance assistance to be activated due to the driving assistance is also changed if the content is turning or intervention braking. For example, when the assistance content of the driving assistance different in type from the collision avoidance assistance is acceleration assistance, there may be a case where the assistance mode of the collision avoidance assistance activated by this driving assistance is intervention braking for prompting deceleration. Further, for example, when the assistance content of the driving assistance different in type from the collision avoidance assistance is assistance for prompting a right turning, there may be a case where the assistance mode of the collision avoidance assistance activated by this driving assistance is assistance for prompting a left turning.

In this respect, according to the above-described configuration, irrespective of whether the assistance mode of the collision avoidance assistance activated by performance of the driving assistance different in type from the collision avoidance assistance is either turning or intervention braking, the driving assistance different from the collision avoidance assistance is suppressed. Thereby, in either case of the collision avoidance assistance by turning and the collision avoidance assistance by intervention braking, arbitration for other types of driving assistance is performed in advance.

In accordance with one aspect of the present invention, the suppressing condition is met based on a prediction that the collision avoidance assistance will be activated again due to performance of the driving assistance different in type from the collision avoidance assistance after termination of the collision avoidance assistance.

The target vehicle state of the collision avoidance assistance does not necessarily match with the target vehicle state of the driving assistance different from the collision avoidance assistance. Thus, when these types of driving assistance are different in the target vehicle states, depending on the vehicle state that has been changed by the collision avoidance assistance, there may be a case where the condition of activating the driving assistance different from the collision avoidance assistance is met. In contrast, when the vehicle state is changed by performance of the driving assistance different from the collision avoidance assistance based on the thus met activation condition, there may be a case where the collision avoidance assistance is needed again after the change in the vehicle state. At this time, there is a fear that a plurality of types of driving assistance may be alternately performed in such a manner that the collision avoidance assistance, the driving assistance different from the collision avoidance assistance and the collision avoidance assistance are performed.

In this respect, according to the above-described configuration, when it is predicted that collision avoidance assistance will be activated again due to performance of the driving assistance different in type from the collision avoidance assistance after termination of the collision avoidance assistance, the above-described suppressing condition is met and the driving assistance different in type from the collision avoidance assistance is suppressed from being activated. It is, thus, possible to suppress in advance the collision avoidance assistance from being activated again due to activation of the driving assistance different in type from the collision avoidance assistance.

An object to be avoided by activating again the collision avoidance assistance is not necessarily the same object but may be a different object. That is, even if no prediction is made for again approaching a first object, the approach of which has been avoided by the collision avoidance assistance, which is temporarily activated, but when a second object approaches due to activation of the driving assistance different in type from the collision avoidance assistance, the collision avoidance assistance is predicted to be activated again.

In this respect as well, according to the above-described configuration, regardless whether the initial collision avoidance assistance and the collision avoidance assistance that is predicted to be activated again have the same or different avoidance targets, activation of the driving assistance different in type from the collision avoidance assistance is suppressed. Thereby, even where multiple objects are present in the vicinity of the assistance target vehicle, the collision avoidance assistance is properly suppressed from being activated again.

In accordance with one aspect of the present invention, when a request for activating the driving assistance different from the collision avoidance assistance is detected during performance of the collision avoidance assistance or when a request for activating the driving assistance different from the collision avoidance assistance is detected after termination of performance of the collision avoidance assistance but before the lapse of the setup time, the assistance arbitration section performs, as the arbitration, at least one of the following processes: a. a delay process for delaying the time of activating the driving assistance different from the collision avoidance assistance; b. a suppressing process for suppressing the driving assistance different from the collision avoidance assistance; and c. a reduction process for reducing an assistance amount of the driving assistance different from the collision avoidance assistance.

According to the above-described configuration or the method, when during performance of collision avoidance assistance, a request for activating driving assistance different from the collision avoidance assistance is detected, a delay process for delaying the time of activating the driving assistance different from the collision avoidance assistance is performed as arbitration. Thereby, when the request for activating the driving assistance different from the collision avoidance assistance is made during performance of the collision avoidance assistance, the driving assistance different from the collision avoidance assistance is performed after the lapse of a specified period of time from termination of the collision avoidance assistance. Therefore, the collision avoidance assistance and the driving assistance different from the collision avoidance assistance are suppressed from being performed within the specified period of time. Further, the driving assistance different from the collision avoidance assistance, activation of which is temporarily suspended, is performed after the lapse of the specified period of time from termination of the collision avoidance assistance. Thereby, the advantages of the driving assistance by the driving assistance different from the collision avoidance assistance are also ensured.

On the other hand, according to the above-described configuration or the method, when after termination of performance of collision avoidance assistance but before the lapse of the setup time, a request for activating the driving assistance different from the collision avoidance assistance is detected, a delay process for delaying the time of activating the driving assistance different from the collision avoidance assistance is performed as arbitration. Thereby, until the lapse of setup time after termination of performance of the collision avoidance assistance, activation of the driving assistance different from the collision avoidance assistance is suppressed. Accordingly, performance of a plurality of types of driving assistance such as the collision avoidance assistance and the driving assistance different from the collision avoidance assistance within the setup time is suppressed. Further, the driving assistance different from the collision avoidance assistance, activation of which is temporarily suspended, is performed after the lapse of setup time. It is, thereby, possible to ensure the effects of driving assistance by the driving assistance different from the collision avoidance assistance.

Further, according to the above-described configuration or the method, when during performance of collision avoidance assistance, a request for activating driving assistance different from the collision avoidance assistance is detected, a process for suppressing activation of the driving assistance different from the collision avoidance assistance is performed as arbitration. Thereby, the request for activating the driving assistance different from the collision avoidance assistance performed during performance of the collision avoidance assistance is temporarily cancelled, thus making it possible to suppress activation of the driving assistance different from the collision avoidance assistance. As a result, simultaneous performance of the collision avoidance assistance and the driving assistance different from the collision avoidance assistance is suppressed, and therefore, mutual interference of the respective types of driving assistance is suppressed. Then, the driving assistance different from the collision avoidance assistance is performed based on the request for activating the driving assistance different from the collision avoidance assistance, which is made after termination of the collision avoidance assistance. Accordingly, at the time of making again the request for activating the driving assistance different from the collision avoidance assistance, in other words, at the time when there is a high need for driving assistance, the activation thereof is permitted.

On the other hand, according to the above-described configuration or the method, when before the lapse of set-up time from termination of performance of collision avoidance assistance, a request for activating driving assistance different from the collision avoidance assistance is detected, a suppressing process for suppressing activation of the driving assistance different from the collision avoidance assistance is performed as arbitration. Accordingly, the request for activating the driving assistance different from the collision avoidance assistance, which has been made before the lapse of setup time from termination of performance of the collision avoidance assistance, is temporarily cancelled, and activation of the driving assistance different from the collision avoidance assistance is suppressed. As a result, the driving assistance different from the collision avoidance assistance is suppressed from being performed soon after termination of the collision avoidance assistance. Therefore, it is possible to suppress unstable behavior of the vehicle due to performance of a plurality of types of driving assistance in a short period of time. Further, after termination of the collision avoidance assistance, the vehicle state, which has been changed by the collision avoidance assistance, is maintained, and the effects of the collision avoidance assistance are favorably maintained. Then, the driving assistance different from the collision avoidance assistance is performed based on the request for activating the driving assistance different from the collision avoidance assistance, which is made again after the lapse of set-up time. Thereby, at the time of making again the request for activating the driving assistance different from the collision avoidance assistance, in other words, at the time when the driving assistance is greatly needed, the activation thereof is permitted.

Further, according to the above-described configuration, when during performance of collision avoidance assistance, a request for activating driving assistance different from the collision avoidance assistance is detected, a reduction process for reducing the assistance amount of the driving assistance different from the collision avoidance assistance is performed as arbitration. Thereby, during performance of the collision avoidance assistance, the driving assistance different from the collision avoidance assistance is performed to a minimum extent. Accordingly, it is possible to attain both the collision avoidance assistance and the driving assistance different from the collision avoidance assistance, while total cancellation of the collision avoidance assistance by the driving assistance different from the collision avoidance assistance is suppressed.

On the other hand, according to the above-described configuration, when before the lapse of the setup time from termination of performance of the collision avoidance assistance, a request for activating driving assistance different from the collision avoidance assistance is detected, a reduction process for reducing the assistance amount of the driving assistance different from the collision avoidance assistance is performed as arbitration. Thereby, when before the lapse of the setup time from termination of performance of collision avoidance assistance, a request for activating the driving assistance different from the collision avoidance assistance is made, the driving assistance different from the collision avoidance assistance, which is reduced in the assistance amount, is performed. As a result, before the lapse of the setup time from termination of performance of the collision avoidance assistance, the driving assistance different in type from the collision avoidance assistance, the activation of which has been requested, is performed within a required minimum range. Thereby, it is possible to suppress to a minimum extent the influence on the collision avoidance assistance due to performance of the driving assistance different from the collision avoidance assistance before the lapse of the setup time.

In accordance with one aspect of the present invention, the physical object is a movable body. Based on a relationship between a first time taken by the assistance target vehicle to reach a meeting point where the vehicle meets the movable body and a second time taken by the movable body to reach the meeting point, the collision avoidance assisting section assists in avoidance of collision between the vehicle and the movable body.

Although at a certain time point no movable body is present ahead of a vehicle in the advancing direction, when the movable body reaches at the same time the vicinity of a position that the vehicle reaches after the lapse of a predetermined period of time, it is more likely that the vehicle may collide with the movable body or they approach too close. On the other hand, if the driver is able to be aware in advance of the time taken by the vehicle and the movable body to reach the point at which the vehicle and the movable body abnormally approach each other, in other words, the site at which the vehicle meets the movable body, the driver is able to prevent near collision between the vehicle and the movable body before the vehicle abnormally approaches the movable body.

Next, according to the above-described configuration, based on a relative relationship between the first time taken by the vehicle to reach a meeting point of the vehicle and a movable body, and the second time taken by the movable body to reach the meeting point, driving assistance is performed to suppress near collision between the vehicle and the movable body. Accordingly, near collision between the vehicle and the movable body is suppressed by slowly reducing the speed of the vehicle without requesting hard braking, abrupt braking operation or the like, thereby the driving assistance is smoothly performed.

Further, based on the above-described first time and the second time, the vehicle can be prompted for turning and deceleration at an earlier stage than an existing type of collision avoidance assistance. On the other hand, the collision avoidance assistance based on the first time and the second time needs arbitration with the driving assistance different from the collision avoidance assistance in many cases because the collision avoidance assistance can be performed in a variety of situations. In this respect as well, according to the above-described configuration, the collision avoidance assistance based on the first time and the second time is arbitrated with the driving assistance different from the collision avoidance assistance, thus making it possible to maintain high assistance advantages of the collision avoidance assistance.

In accordance with one aspect of the present invention, when a request for activating the driving assistance different from the collision avoidance assistance is detected during performance of the collision avoidance assistance or when a request for activating the driving assistance different from the collision avoidance assistance is detected after termination of performance of the collision avoidance assistance but before the lapse of the setup time, the assistance arbitration section suppresses the driving assistance different from the collision avoidance assistance in a period of time during which at least one of the first time and the second time is converted from a positive value to a negative value.

According to the above-described configuration, in the period of time during which at least one of the first time and the second time is converted from a positive value to a negative value, the driving assistance different from the collision avoidance assistance is suppressed. In other words, when at least one of the first time and the second time is converted from a positive value to a negative value, activation of the driving assistance different from the collision avoidance assistance, which has been suppressed, is permitted. Therefore, when the first time is converted from a positive value to a negative value due to the fact that, for example, the assistance target vehicle has passed through a meeting point with a movable body, performance of the driving assistance different from the collision avoidance assistance is permitted due to a low activation probability in the collision avoidance assistance. Thereby, when the activation probability of the collision avoidance assistance is lowered, the driving assistance different from the collision avoidance assistance is performed before the lapse of the specified period of time. It is possible to favorably maintain the effects of assistance by the driving assistance different from the collision avoidance assistance.

Further, according to the above-described configuration, when the second time is converted from a positive value to a negative value due to the fact that, for example, a movable body has passed through a meeting point with the assistance target vehicle, performance of the driving assistance different from the collision avoidance assistance is permitted due to a low activation probability in the collision avoidance assistance. Thereby, when the activation probability of the collision avoidance assistance is lowered, the driving assistance different from the collision avoidance assistance is performed before the lapse of a specified period of time. It is possible to favorably maintain the effects of assistance by the driving assistance different from the collision avoidance assistance.

Further, in a similar manner, according to the above-described configuration, even when the activation probability of the collision avoidance assistance is significantly lowered due to the fact that, for example, the assistance target vehicle and a movable body have passed through a meeting point or the advancing direction is changed, performance of the driving assistance different from the collision avoidance assistance is permitted because it is determined that each of the first time and the second time is converted from a positive value to a negative value. Thereby, when the activation probability of the collision avoidance assistance is lowered to a great extent, the driving assistance different from the collision avoidance assistance is performed before the lapse of a specified period of time. It is possible to favorably maintain the advantages of assistance by the driving assistance different from the collision avoidance assistance.

In accordance with one aspect of the present invention, the collision avoidance assisting section has a map in which an assistance region of performing driving assistance and non-assistance region of performing no driving assistance are specified with respect to a relative relationship between the first time and the second time. The collision avoidance assisting section performs the collision avoiding assistance by referring to the map.

According to the above-described configuration, upon performance of the collision avoiding assistance, a map is used in which an assistance region of performing driving assistance and a non-assistance region of performing no driving assistance are specified with respect to a relative relationship between the first time and the second time. Therefore, depending on in which region the first time and the second time based on the assistance target vehicle and a movable body in the vicinity thereof belong to the assistance region or the non-assistance region in the map, it is determined as to whether the collision avoiding assistance should be requested for activation. It is, thereby, possible to easily determine whether activation of the collision avoiding assistance is needed.

In accordance with one aspect of the present invention, the driving assistance different in type from the collision avoidance assistance is at least one of: lane-keeping travel assistance for prompting the assistance target vehicle to be maintained at a traveling position within a lane; skidding suppressing assistance for assisting the assistance target vehicle in suppressing skidding; and autonomous travel assistance for assisting the assistance target vehicle in traveling autonomously.

In the lane-keeping travel assistance for prompting the assistance target vehicle in keeping a traveling position within a lane, control for prompting turning and deceleration of the vehicle to keep the traveling position of the vehicle within the lane is often performed. Further, the lane-keeping travel assistance is activated regardless of the presence of an object in the vicinity of the vehicle. Therefore, there may be a case where the collision avoidance assistance and the lane-keeping travel assistance is activated within a predetermined period of time or the collision avoidance assistance will be activated at the same time with the lane-keeping travel assistance. Then, the lane keeping assistance and the collision avoidance assistance may be performed to result in mutual interference of the respective types of assistance or unstable behavior of the vehicle due to alternate performance of the respective types of assistance depending on the time and assistance content thereof.

In this respect, according to the above-described configuration, even in a case where the collision avoidance assistance and the lane keeping assistance are performed for one vehicle, the collision avoidance assistance and the lane keeping assistance are arbitrated. Therefore, it is possible to suppress mutual interference of the collision avoidance assistance and the lane keeping assistance or alternate performance of the collision avoidance assistance and the lane keeping assistance.

Further, in the skidding suppressing assistance for assisting the assistance target vehicle in suppressing skidding thereof, control for prompting deceleration and turning via braking applied to specified wheels is often performed, and the assistance is activated irrespective of the collision avoidance assistance. Then, the skidding suppressing assistance and the collision avoidance assistance may be performed to result in mutual interference of the respective types of assistance or unstable behavior of the vehicle due to alternate performance of the types of assistance, depending on the time and assistance content thereof.

In this respect, according to the above-described configuration, even in a case where the collision avoidance assistance and the skidding suppressing assistance are performed for one vehicle, the collision avoidance assistance and the skidding suppressing assistance are arbitrated. As a result, it is possible to suppress mutual interference of the collision avoidance assistance and the skidding suppressing assistance or alternate performance of the collision avoidance assistance and the skidding suppressing assistance.

DETAILED DESCRIPTION OF THE PREFERRED EMBODIMENTS

First Embodiment

Hereinafter, a description will be given of a driving assistance apparatus and a driving assistance method according to a first embodiment of the present invention with reference to FIGS. 1 to 9.

Figure 1:
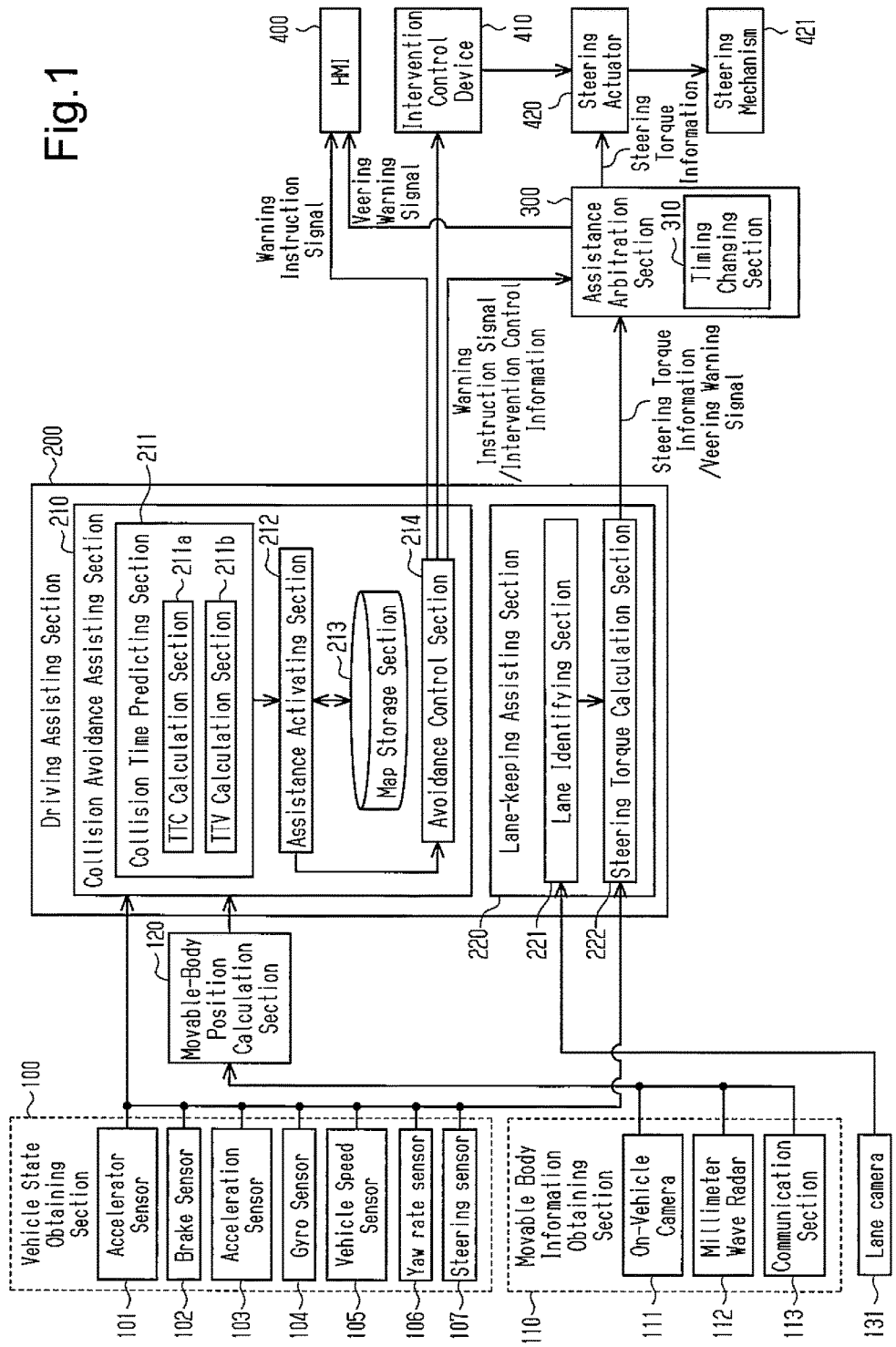
FIG. 1 is a block diagram showing a schematic configuration of a vehicle to which a driving assistance apparatus and a driving assistance method of a first embodiment of the present invention are applied.

As shown in FIG. 1, a vehicle to which the driving assistance apparatus and the driving assistance method of the present embodiment are applied is provided with a vehicle state obtaining section 100, which obtains information on a state of the vehicle. The vehicle is also provided with a movable body information obtaining section 110, which obtains information on a physical object that is a movable body such as a person or a vehicle present in the vicinity of a vehicle that is an assistance target.

The vehicle state obtaining section 100 is configured by, for example, an accelerator sensor 101, a brake sensor 102, an acceleration sensor 103, a gyro sensor 104, a vehicle speed sensor 105, a yaw rate sensor 106, and a steering sensor 107. Each of the sensors 101 to 105 is electrically connected to a driving assisting section 200, which performs driving assistance based on detection results by these sensors 101 to 107.

The accelerator sensor 101 detects a depressing amount of an accelerator, which varies by operation of the accelerator pedal by the driver, and outputs a signal in accordance with the detected depressing amount of the accelerator to the on-vehicle driving assisting section 200. The brake sensor 102 detects whether the driver operates the brake pedal and outputs a signal in accordance with the thus detected operation to the driving assisting section 200. The acceleration sensor 103 detects acceleration of the vehicle and outputs a signal in accordance with the thus detected acceleration to the driving assisting section 200. The gyro sensor 104 detects the direction in which the vehicle moves and outputs a signal in accordance with the thus detected advancing direction to the driving assisting section 200. The vehicle speed sensor 105 detects a vehicle speed, which is the speed of the vehicle, and outputs a signal in accordance with the thus detected vehicle speed to the driving assisting section 200. The yaw rate sensor 106 detects a yaw rate, which is the changing speed of the rotation angle in a direction in which the vehicle turns and outputs a signal corresponding to the thus detected yaw rate to the driving assisting section 200. The steering sensor 107 calculates the steering angle of the vehicle based on a change amount in the steering angle of the detected steering system and outputs a signal corresponding to the calculated steering angle to the driving assisting section 200.

The movable body information obtaining section 110 is provided with an on-vehicle camera 111, which is mounted on the vehicle to pick up images of surrounding environments of the vehicle, a millimeter wave radar 112, which detects objects present in the vicinity of the vehicle, and a communication apparatus 113, which has a wireless communication function.

The on-vehicle camera 111 picks up images of a predetermined range ahead of the vehicle by using an optical charge coupled device (CCD) camera installed at the back of a rearview mirror or the like. The on-vehicle camera 111 outputs image signals based on picked up images to the driving assisting section 200.

The millimeter wave radar 112 is provided with a distance measurement function for measuring a distance between, for example, an object present in the vicinity of a vehicle and the host vehicle, and a speed measurement function for measuring a relative speed between the object and the host vehicle. Upon detection of an object present in the vicinity of the host vehicle, the millimeter wave radar 112 outputs a signal that represents the detection result to the driving assisting section 200.

The communication apparatus 113 obtains information on traveling speed and latitude/longitude of the other vehicle via inter-vehicle communications with, for example, the other vehicle present in the vicinity of the host vehicle. The communication apparatus 113 outputs the thus obtained information to the driving assisting section 200. The communication apparatus 113 also makes road-to-vehicle communications with an optical beacon antenna installed on a road. The communication apparatus 113 obtains an infrastructure information signal via road-to-vehicle communications with the optical beacon antenna. Upon receiving the infrastructure information signal, the communication apparatus 113 outputs the thus received infrastructure information signal to the driving assisting section 200. The infrastructure information signal includes, for example, the distance up to a street crossing, the signal cycle of a signal generator installed on the street crossing, a geometric line form of road and road conditions on which the optical beacon antenna is installed (the shape of street crossings, the curvature, the gradient, and the number of lanes). The infrastructure information signal also includes information in association with the road and information on movable bodies such as other vehicles in the vicinity of the street crossing detected by ground facilities.

A movable body position calculation section 120 calculates the position of a movable body detected based on information input from the movable body information obtaining section 110. The movable body position calculation section 120 makes analysis of picked up images shown by an image signal input from, for example, the on-vehicle camera 111, thereby identifying a movable body present in the vicinity of the vehicle and the position of the movable body. Further, the movable body position calculation section 120 determines the distance between a movable body present in the vicinity and the host vehicle and the moving speed of the movable body by a signal input from, for example, the millimeter wave radar 112. Still further, the movable body position calculation section 120 identifies the direction in which the movable body present in the vicinity of the host vehicle moves based on a signal input from, for example, the millimeter wave radar 112. In addition thereto, upon input of infrastructure information from the communication apparatus 113, the movable body position calculation section 120 identifies the distance between the movable body present in the vicinity of the host vehicle and the host vehicle, the moving speed of the movable body and the movement direction of the movable body based on the infrastructure information. The movable body position calculation section 120 outputs a signal showing the identification result to the driving assisting section 200.

The movable body is identified, for example, based on any one of the picked up result of the on-vehicle camera 111, the signal input from the millimeter wave radar 112 and the infrastructure information input from the communication apparatus 113.

The vehicle is also provided with a lane camera 131, which picks up images of road lanes. The lane camera 131 picks up images of the road lanes and outputs a picked up images to the driving assisting section 200.

The driving assisting section 200 is provided with a collision avoidance assisting section 210, which performs collision avoiding assistance in avoidance of collision between the assistance target vehicle and a movable body present in the vicinity thereof, that is, a physical object. The driving assisting section 200 is also provided with a lane-keeping assisting section 220, which performs lane keeping assist, or assistance for guiding the assistance target vehicle to keep a traveling position thereof at a position along the lane.

The collision avoidance assisting section 210 is provided with a collision time predicting section 211, which predicts the time taken by the vehicle and a movable body present in the vicinity thereof to reach a meeting point at which the movement path of the vehicle intersects with that of the movable body.

The driving assisting section 200 is electrically connected with an on-vehicle human machine interface (HMI) 400, which transmits various types of information to the driver, and an on-vehicle intervention control device 410, which performs intervention control. Further, the vehicle is electrically connected with a steering actuator 420, which drives a steering mechanism 421 of the vehicle.

The collision time predicting section 211 is provided with a TTC calculation section 211a which calculates a first time TTC (Time To Collision) which reaches a meeting point of a vehicle and a movable body. The first time TTC of the present embodiment corresponds to the time taken by the host vehicle to reach a point of collision with the movable body when the host vehicle travels while maintaining the current course and the current traveling speed.

The TTC calculation section 211a calculates the first time TTC based on the following expression (1), where the traveling speed of the host vehicle is represented by V, the relative position of the movable body in relation to the host vehicle is represented by as x, and the speed of the movable body is represented by vx.

$$TTC = x/(V-vx) \quad (1)$$

The TTC calculation section 211a determines the traveling speed of the host vehicle V based on detection results of the vehicle speed sensor 105. The TTC calculation section 211a also determines the position of the movable body x and the speed of the movable body vx based on signals input from the movable body information obtaining section 110.

Further, the collision time predicting section 211 is provided with a TTV calculation section 211b, which calculates a second time TTV (Time To Vehicle) taken by a movable body to reach a meeting point. The second time TTV of the present embodiment corresponds to the time taken by the movable body to reach a point of collision with a vehicle when the movable body moves while maintaining the current course and the current traveling speed.

The TTV calculation section 211b calculates the second time TTV based on the following expression (2), where the relative position of the own vehicle in relation to the movable body is represented by y and the speed of the movable body is represented by vy.

$$TTV = y/(vy) \quad (2)$$

The TTV calculation section 211b determines the relative position y of the movable body in relation to the host vehicle and the speed of the movable body vy based on signals input from the movable body information obtaining section 110.

Figure 2:
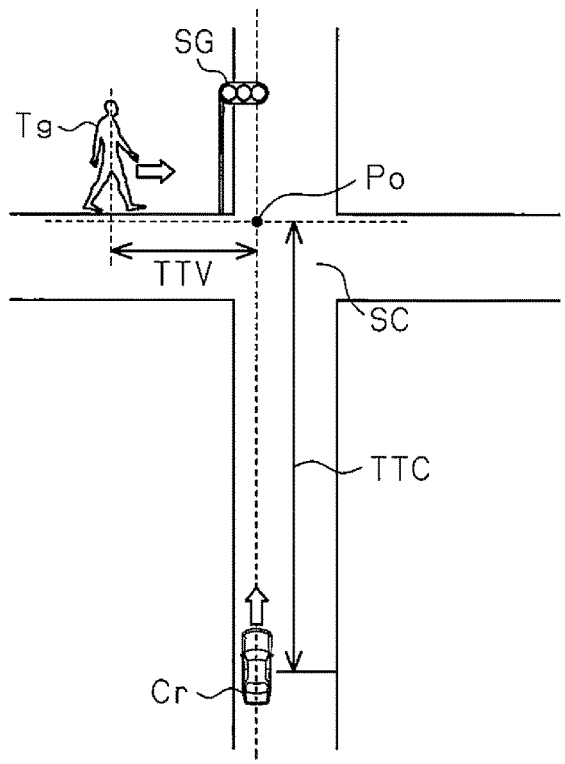
FIG. 2 is a schematic diagram showing a relative relationship between a vehicle and a pedestrian that intersect at a street crossing.

As illustrated in FIG. 2, it is assumed that a vehicle Cr, which is an assistance target, and a pedestrian Tg move in a direction in which they meet each other toward a street crossing SC at which a signal generator SG is installed. In this illustrated example, the time taken by the vehicle Cr to reach a meeting point Po of the vehicle Cr and the pedestrian Tg corresponds to the first time TTC. Further, the time taken by the pedestrian Tg to reach the meeting point Po corresponds to the second time TTV. That is, the meeting point Po is an intersection point at which a predicted movement path of the vehicle Cr intersects a predicted movement path of the movable body.

Further, as shown in FIG. 1, the collision avoidance assisting section 210 of the present embodiment is provided with a map storage section 213, which stores a map showing a relative positional relationship between the first time TTC and the second time TTV.

Figure 3:
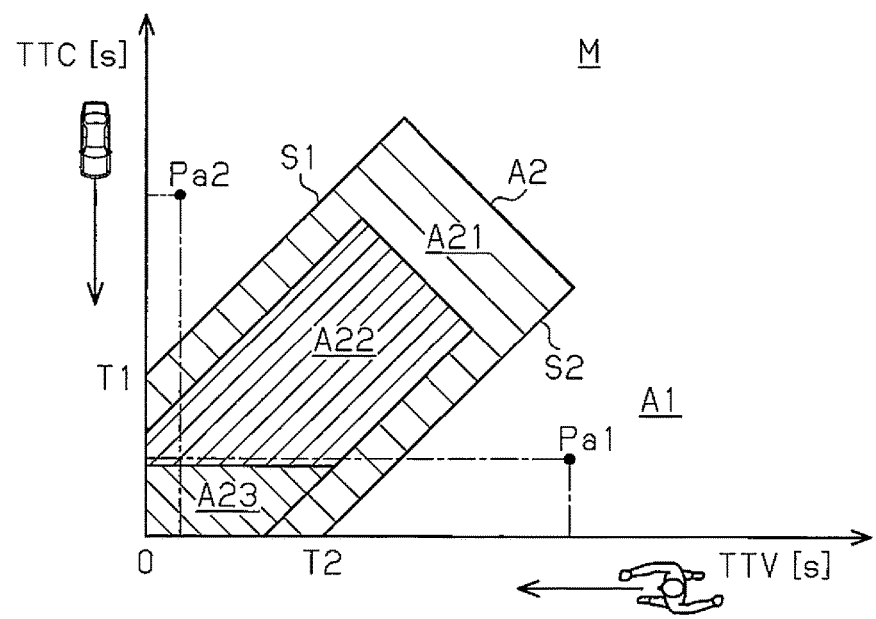
FIG. 3 is a map showing a relative relationship between a first time and a second time.

As shown in FIG. 3, the map storage section 213 records a map M that is specified so that the longitudinal axis indicates the first time TTC [s] and the horizontal axis indicates the second time TTV [s]. In the map M, the origin [0] corresponds to the meeting point Po of the vehicle Cr and the pedestrian Tg in FIG. 2. In the map M, the intersection point of the first time TTC and the second time TTV is spaced away from the origin with an increase in the first time TTC or the second time TTV. Moreover, as the intersection point of the first time TTC and the second time TTV is spaced away at greater distances from the origin, the vehicle Cr and the pedestrian Tg at a calculation time point of the first time TTC and the second time TTV are positioned at sites spaced mutually away at greater distances from the meeting point Po.

Further, in the map M of the present embodiment, there is provided a non-assistance region A1, which will not activate collision avoiding assistance in avoidance of collision between a vehicle Cr, which is an assistance target, and a movable body such as a pedestrian Tg or another vehicle. In the map M, there is also provided an assistance region A2, which will activate the collision avoiding assistance. The non-assistance region A1 and the assistance region A2 are, for example, an area specified based on experiment data and the like. It is also possible to provide the non-assistance region A1 and the assistance region A2 based on learning results of driving characteristics such as accelerator characteristics and brake characteristics of the driver.

In the present embodiment, when the relative position between the above-calculated first time TTC and the second time TTV in the map M is located at the non-assistance region A1, no condition for activating the collision avoiding assistance is met. On the contrary, when the relative position of the calculated first time TTC and the second time TTV in the map M is located at the assistance region A2, the condition for activating the collision avoiding assistance is met.

The assistance region A2 is a region enclosed by a function of y=fx (TTC, TTV). Two ever-increasing straight lines S1 and S2 which form a boundary line between the assistance region A2 and the non-assistance region A1 are set by a difference (TTC-TTV) between the first time TTC and the second time TTV. Time corresponding to 1 to 3 seconds, for example, is set in time T1 when the straight line S1 crosses vertically the first time TTC. In a similar manner, time corresponding to 1 to 3 seconds, for example, is also set in time T2 when the straight line S2 crosses the horizontal axis of the second time TTV.

As shown in FIG. 3, the assistance region A2 is divided into a HMI area A21, an intervention control area A22 and an emergency intervention control area A23 in accordance with the urgency of driving assistance.

The HMI area A21 is specified at a position most distant from the origin 0 between the first time TTC and the second time TTV in the assistance region A2. The HMI area A21 is an area in which the driver is given driving assistance which warns the presence of a movable body and near collision between the vehicle Cr and the movable body. Driving assistance which is specified in the HMI area A21 is performed when the above-calculated first time TTC and the second time TTV are positioned in the HMI area A21.

The intervention control area A22 is an area in which intervention control such as braking is performed and is positioned at a site closer to the origin 0 than the HMI area A21. The emergency intervention control area A23 is an area in which emergency intervention such as hard braking is performed in order to avoid collision between a movable body and a vehicle Cr and is positioned in a predetermined range from the origin 0. The emergency intervention control area A23 is positioned at a site which is closest to the origin 0 in the assistance region A2 and specified at a position closest to the meeting point Po of the vehicle Cr and the movable body.

The non-assistance region A1 is a part other than the assistance region A2 and an area that does not need driving assistance in avoidance of collision between the vehicle Cr and a movable body. For example, in FIG. 3, a point Pa1 (TTV, TTC) positioned within the non-assistance region A1 is given as the first time TTC<<the second time TTV. When the first time TTC<<the second time TTV, the movable body reaches the meeting point Po after the lapse of time greater than or equal to a predetermined time from the time when the vehicle Cr has passed through the meeting point Po. In contrast, a point Pa 2 (TTV, TTC) positioned within the non-assistance region A1 is given as the first time TTC>>the second time TTV. When the first time TTC>>the second time TTV, the vehicle Cr reaches the meeting point Po after the lapse of time greater than or equal to a predetermined time from the time when the movable body has passed through the meeting point Po. Thereby, in the non-assistance region A1, time at which the vehicle Cr and the movable body reach the meeting point Po is different by time greater than or equal to a predetermined time, and a distance between the vehicle Cr and the movable body is kept apart at a distance greater than or equal to a predetermined distance, driving assistance is not necessary.

As shown in FIG. 1, an assistance activating section 212, which forms the collision avoidance assisting section 210, determines whether the condition of activating the collision avoiding assistance has been met. The assistance activating section 212 determines whether the condition of activation has been met based on the above-calculated first time TTC and the second time TTV as well as the map M. The assistance activating section 212 determines that the condition of activating the collision avoiding assistance has been met when the above-calculated first time TTC and the second time TTV is positioned in any one of the HMI area A21, the intervention control area A22 and the emergency intervention control area A23, which form the assistance region A2.

Upon calculation of the first time TTC and the second time TTV, the assistance activating section 212 identifies at which area on the map M the intersection point of the first time TTC and the second time TTV is positioned.

Figure 4:
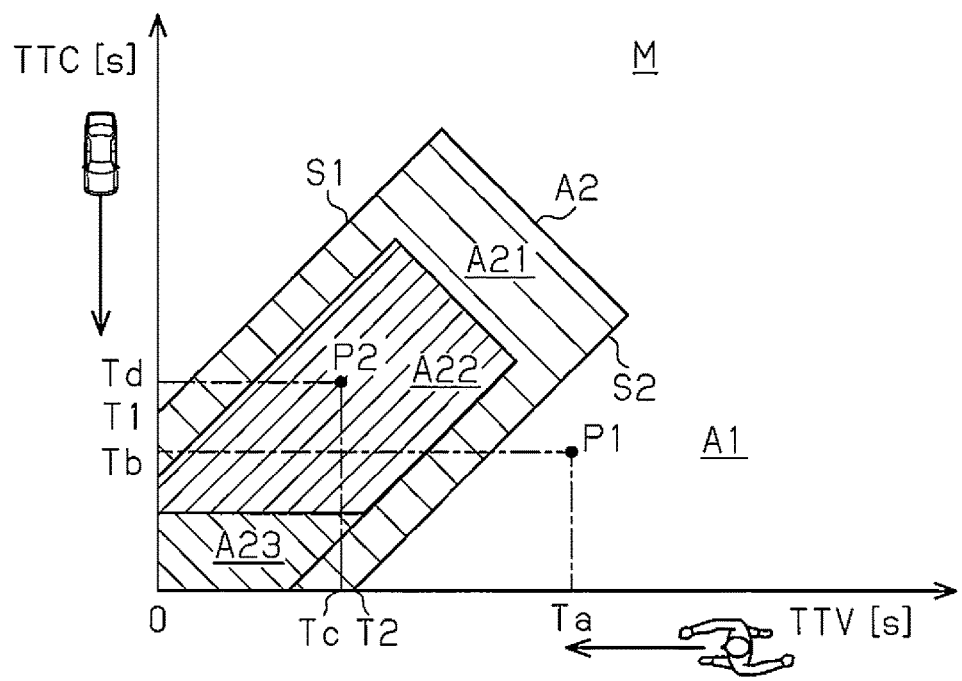
FIG. 4 is a map showing a relative relationship between the first time and the second time.

As illustrated in FIG. 4, when a position (intersection point) at which the first time TTC intersects the second time TTV is a point P1 (Ta, Tb), the point P1 is positioned in the non-assistance region A1. Accordingly, the assistance activating section 212 determines that no condition of activating the collision avoiding assistance is met. On the other hand, when the position at which the first time TTC intersects the second time TTV is a point P2 (Tc, Td), the point P2 is positioned in the assistance region A2. Therefore, the assistance activating section 212 determines that the condition of activating the collision avoiding assistance is met.

In the present embodiment, the intersection point at which the first time TTC intersects the second time TTV indicates a relative relationship between the first time TTC and the second time TTV.

When the condition of activation is met, the assistance activating section 212 outputs a signal that indicates areas (the HMI area A21, the intervention control area A22 and the emergency intervention control area A23) at which the above-calculated first time TTC intersects the second time TTV to an avoidance control section 214, which performs collision avoiding assistance, as shown in FIG. 1. Further, when the condition of activation is met, the assistance activating section 212 outputs to the avoidance control section 214 signals that indicate, for example, the above-calculated first time TTC and the second time TTV as well as latitude/longitude of a meeting point.

Upon input of various signals from the assistance activating section 212, the avoidance control section 214 selects driving assistance in accordance with the HMI area A21, the intervention control area A22 and the emergency intervention control area A23. The avoidance control section 214 generates a warning instructing signal for activating warning by a HMI 400 when the intersection point of the above-calculated first time TTC and the second time TTV is positioned in the HMI area A21. Next, the avoidance control section 214 outputs the thus generated warning instructing signal to the HMI 400. The warning instructing signal includes, for example, a position of the movable body, which is predicted to collide with a vehicle Cr, the distance up to the movable body and predicted time of collision. Further, the avoidance control section 214 of the present embodiment outputs a warning instruction signal also to an on-vehicle assistance arbitration section 300, which performs an arbitration process for arbitrating a plurality of types of driving assistance.

Further, when the intersection point of the above-calculated first time TTC and the second time TTV is positioned in the intervention control area A22 or the emergency intervention control area A23, the avoidance control section 214 generates intervention control information, which allows the intervention control device 410 to apply intervention braking. Then, the avoidance control section 214 outputs the thus generated intervention control information to the intervention control device 410, which controls the assistance target vehicle to turn or decelerate. Further, the avoidance control section 214 of the present embodiment outputs the intervention control information also to the on-vehicle assistance arbitration section 300, which performs an arbitration process for arbitrating a plurality of types of driving assistance.

The intervention control information includes, for example, a control amount such as a manipulation amount of the steering system or a deceleration amount of a brake which is capable of bringing the first time TTC positioned within the assistance region A2 to outside the assistance region A2, that is, within the non-assistance region A1. The control amount indicated by the intervention control information is set so that a control amount of the emergency intervention control area A23 is greater than a control amount of the intervention control area A22.

On the other hand, the lane-keeping assisting section 220, which forms the driving assisting section 200, is provided with a lane identifying section 221 for identifying a lane from images picked up by the lane camera 131. The lane-keeping assisting section 220 is also provided with a steering torque calculation section 222, which calculates a steering torque for performing lane keeping assistance (lane keeping assist) based on the identified lane.

Upon input of the images picked up by the lane camera 131, the lane identifying section 221 identifies the road lane on which the assistance target vehicle travels. The lane identifying section 221 outputs an identification result to the steering torque calculation section 222.

Upon input of the identification result, the steering torque calculation section 222 calculates a deviation amount between the position of vehicle wheels that are assistance target and the position of the lane. Upon calculation of the deviation amount, the steering torque calculation section 222 determines whether the deviation amount is greater than or equal to a threshold value that has been previously set as a condition of activating the lane keeping assistance. When the deviation amount is greater than or equal to the threshold value, the steering torque calculation section 222 obtains a signal corresponding to a steering angle from the steering sensor 107. The steering torque calculation section 222 calculates the steering torque for guiding the assistance target vehicle to keep the traveling position thereof within the lane based on the deviation amount and the signal obtained. Upon calculation of the steering torque, the steering torque calculation section 222 outputs an LKAS control instruction to the assistance arbitration section 300 for performing the lane keeping assistance based on the thus calculated steering torque. Further, the steering torque calculation section 222 generates a veering warning signal for warning veering from the lane and outputs the thus generated veering warning signal to the assistance arbitration section 300.

The assistance arbitration section 300 of the present embodiment arbitrates between the collision avoidance assistance, which is braking based on intervention control information output by the avoidance control section 214 of the collision avoidance assisting section 210, and the lane keeping assistance performed by the lane-keeping assisting section 220.

The assistance arbitration section 300 of the present embodiment is also provided with a timing changing section 310, which arbitrates between the respective types of driving assistance by changing times of performance the collision avoidance assistance and the lane keeping assistance, which prompt turning in the conflicting directions. The timing changing section 310 monitors whether braking is being applied to the assistance target vehicle based on intervention control information input from the avoidance control section 214 of the collision avoidance assisting section 210. Further, the timing changing section 310 measures time elapsed from termination of the previous braking based on the intervention control information.

When a request for activating the lane keeping assistance is made by the lane-keeping assisting section 220 during performance of the collision avoidance assistance by the collision avoidance assisting section 210, the timing changing section 310 determines whether the turning directions of the respective types of assistance are the same. Then, when the determined turning directions are conflicting, the timing changing section 310 performs a delay process for delaying the time of activating the lane keeping assistance only by a specified period of time that has been specified in advance. The specified period of time includes, for example, a specified period of time in which the intersection point of the first time TTC and the second time TTV is able to move to a position away by a certain distance or more from the assistance region A2 by turning by the collision avoidance assistance. The specified period of time is specified, for example, based on data obtained from driving results of a plurality of drivers.

Further, when a request for activating the lane keeping assistance is made by the lane-keeping assisting section 220 before the lapse of a specified period of time from termination of performance of the collision avoidance assistance by the collision avoidance assisting section 210, the timing changing section 310 determines whether the turning directions of the respective types of assistance are the same. Then, the timing changing section 310 performs a delay process in a similar manner.

The timing changing section 310 performs, as a delay process, a process in which the LKAS control instruction input from the steering torque calculation section 222 is output to the HMI 400 and the steering actuator 420 after the lapse of a specified period of time. Thereby, a veering warning signal is input to the HMI 400 after the lapse of only a specified period of time from the time when the lane-keeping assisting section 220 has output information that shows a steering torque. Accordingly, the LKAS control instruction is input to the steering actuator 420 after the lapse of only the specified period of time from the time when the lane-keeping assisting section 220 has output the information that shows the steering torque.

Then, the HMI 400 provides a warning to the effect that the vehicle has a high probability of veering from the lane or to the effect that the vehicle has veered from the lane by sound guidance or image guidance, depending on a veering warning signal after the lapse of a specified period of time from performance of turning by the collision avoidance assistance. Further, the steering actuator 420 controls the steering mechanism 421 corresponding to the information that shows the steering torque. Thereby, after the lapse of a specified period of time from performance of the turning by the collision avoidance assistance, the steering is vibrated or a steering force is generated. As a result, it is possible to suppress assistance that prompts simultaneous performance of turning in conflicting directions or repeated performance of turning in a short period of time.

The HMI 400 is configured by, for example, an audio device, a head-up display, the monitor of a navigation system, an instrument panel, and the like. Upon input of a warning instructing signal from the avoidance control section 214, the HMI 400 gives warning to the driver, for example, the presence of a person or a vehicle ahead in the advancing direction and displays a warning message on the head-up display or the like. Further, upon input of the warning instruction signal from the avoidance control section 214, the HMI 400 triggers turning-prompting sounds or displays turning-prompting images and warning messages for avoiding collision with, for example, an object present in the vicinity of the vehicle.

The intervention control device 410 is electrically connected to, for example, a braking control device for controlling the brake actuator of the vehicle and various components of the steering actuator 420.

Upon input of the intervention control information from the avoidance control section 214, the intervention control device 410 controls the steering actuator 420, the braking controller, and the like, based on the intervention control information. Thereby, a relative position between the first time TTC and the second time TTV is changed due to a change in steering of the vehicle or reduction in traveling speed of the vehicle. Then, the assistance target vehicle avoids the above-described meeting point Po or a movable body, and the movable body passes through the meeting point Po before the vehicle reaches the meeting point. That is, approach of the vehicle to the movable body can be suppressed to avoid collision between the vehicle and the movable body.

When the LKAS control instruction output by the lane-keeping assisting section 220 is input via the assistance arbitration section 300, the steering actuator 420 controls the steering mechanism 421 corresponding to the LKAS control instruction.

In the present embodiment, the driving assistance apparatus is configured by the collision avoidance assisting section 210 and the assistance arbitration section 300.

Next, operation of the driving assistance apparatus and the driving assistance method of the present embodiment will be described with reference to FIGS. 5 to 9.

Figure 5:
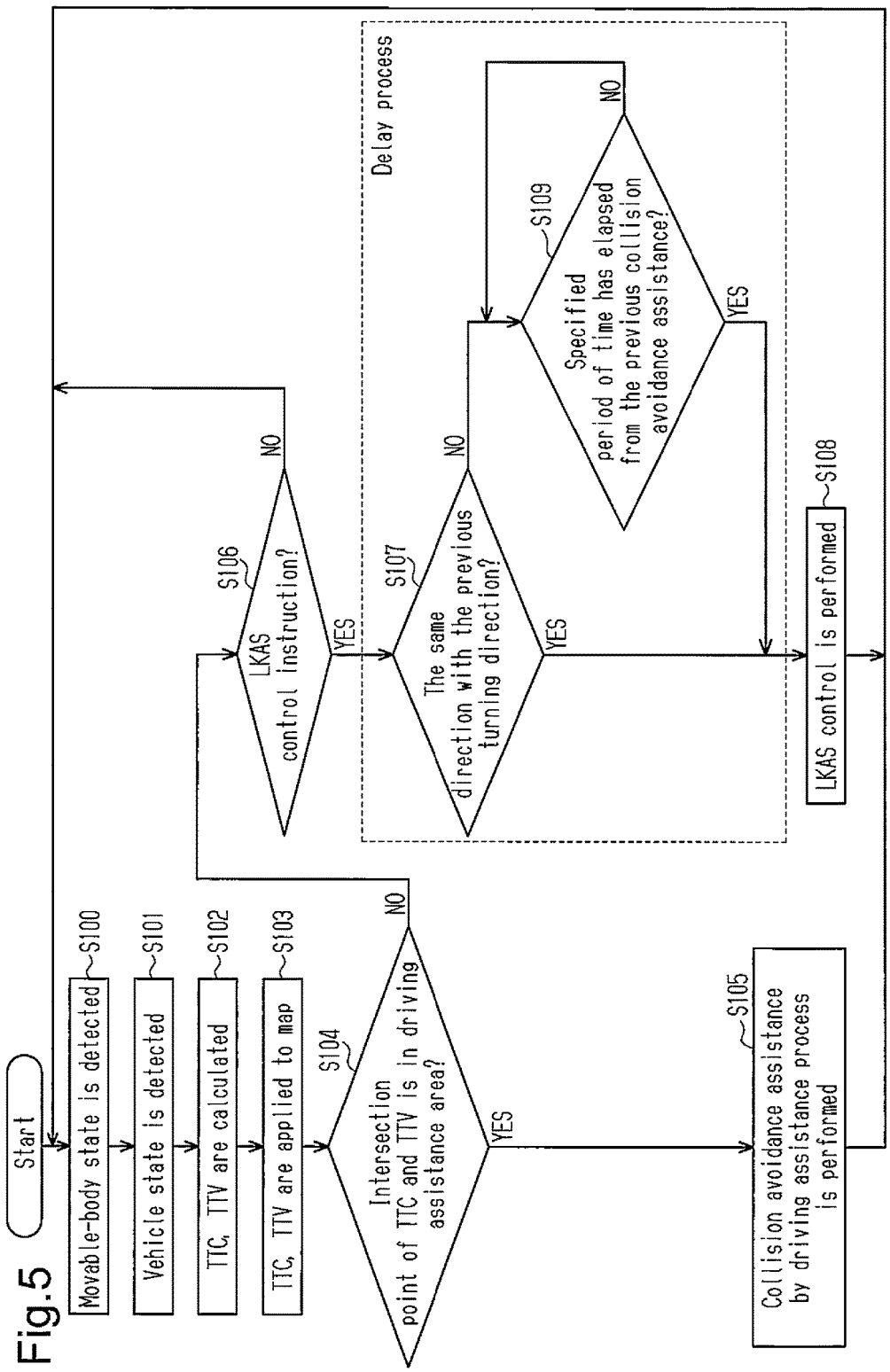
FIG. 5 is a flowchart showing one example of an arbitration process in this embodiment.

As shown in FIG. 5, first, in Step S100, upon detection of a movable body such as a pedestrian present or a vehicle in the vicinity of the host vehicle, the position of the movable body, the advancing direction thereof, and the moving speed thereof, that is, the velocity vector are detected.

Next, upon detection of the position, the advancing direction, and the moving speed the host vehicle, the first time TTC and the second time TTV are calculated (Steps S101, S102). Next, the thus calculated first time TTC and the second time TTV are applied on the map M to identify a position at which the first time TTC intersects the second time TTV, that is, the relative relationship between the first time TTC and the second time TTV (Step S103).

When the intersection point of the first time TTC and the second time TTV is identified, the position thereof is determined whether it belongs to the assistance region A2 (Step S104). When the intersection point of the first time TTC and the second time TTV is within a range of the assistance region A2 (Step S104: YES), collision avoiding assistance is performed by the collision avoidance assisting section 210 via a driving assistance process (Step S105). Then, in Step S100, detection is again made for a movable body present in the vicinity of the assistance target vehicle.

On the other hand, in Step S104, when it is determined that the intersection point of the first time TTC and the second time TTV does not belong to the assistance region A2, no collision avoiding assistance is performed on the grounds that the assistance target vehicle is unlikely to collide with a movable body present in the vicinity thereof (Step S104: NO).

Then, it is determined whether the lane-keeping assisting section 220 outputs the LKAS control instruction (Step S106). The assistance arbitration section 300 detects that a request for activating the lane keeping assistance has been made by the lane-keeping assisting section 220 based on the LKAS control instruction output by the lane-keeping assisting section 220.

Then, while the request for activating the lane keeping assistance is being made (Step S106: YES), it is determined whether the turning direction prompted by the collision avoidance assistance performed in Step S105 is the same as the turning direction prompted by the lane keeping assistance (Step S107).

Then, when the turning directions by the respective types of assistance are the same (Step S107: YES), LKAS control by the lane keeping assistance is performed (Step S108).

On the other hand, for example, when the turning directions by the respective types of assistance are conflicting directions and not the same directions (Step S107: NO), it is determined whether a specified period of time has elapsed from termination of the previous collision avoidance assistance (Step S109). Then, on condition that the specified period of time has elapsed from termination of the collision avoidance assistance, the lane keeping assistance is permitted to perform LKAS control by the lane keeping assistance (Step S108).

As a result, a warning is provided through the HMI 400 or a steering force is generated to the steering mechanism 421 so that the vehicle is able to maintain the traveling position thereof within a range of the lane via the lane keeping assistance.

In the present embodiment, Step S105 in FIG. 5 corresponds to the collision avoidance step. Further, Steps S107 and S109 correspond to the assistance arbitrating step.

Next, a detailed description will be given of procedures of collision avoiding assistance by the driving assistance process of Step S105 in FIG. 5 with reference to FIG. 6.

Figure 6:
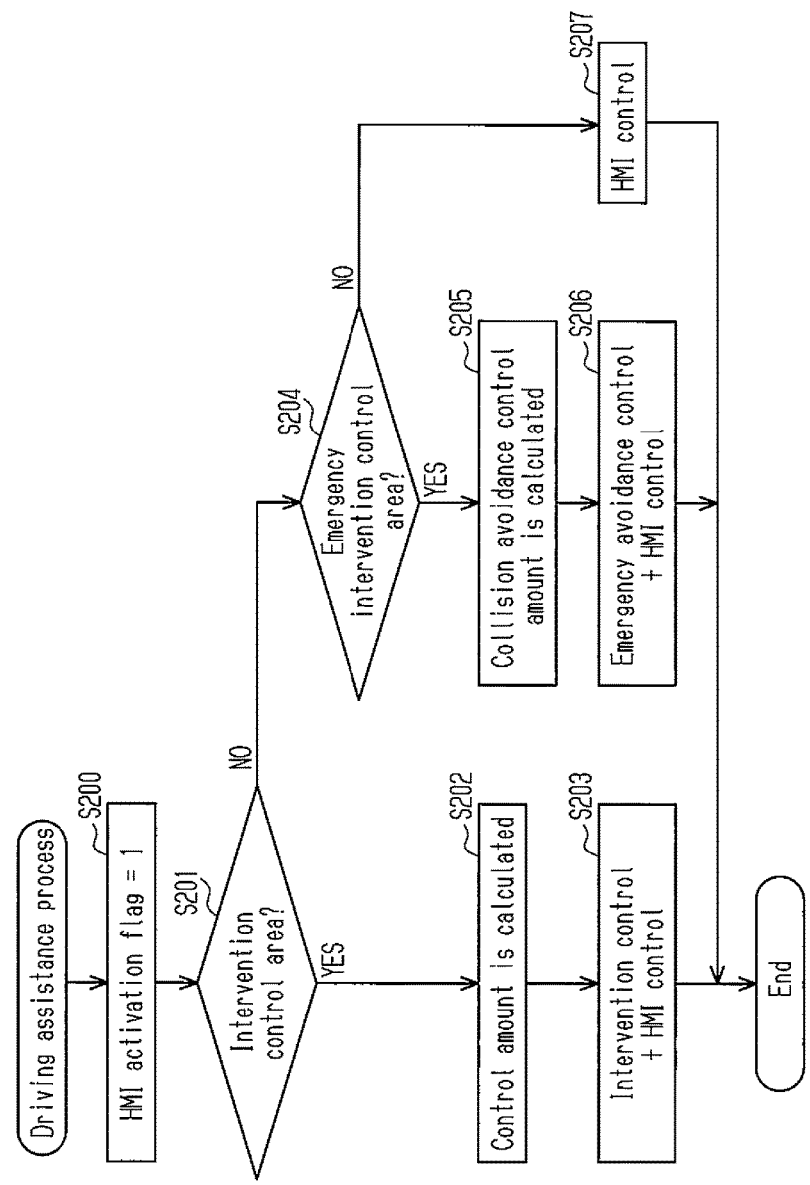
FIG. 6 is a flowchart showing one example of a driving assistance process by a collision avoidance assisting section.

As shown in FIG. 6, first, since the intersection point of the first time TTC and the second time TTV belongs to the assistance region A2 on performance of this process, a HMI activation flag for activating the HMI 400 is set to be 1 (Step S200).

Next, it is determined whether the intersection point of the first time TTC and the second time TTV belongs to the intervention control area A22 in the assistance region A2 (Step S201). When the intersection point of the first time TTC and the second time TTV belongs to the intervention control area A22 (Step S201: YES), a control amount of intervention control is calculated based on, for example, the map M (Step S202). Next, based on the thus calculated control amount, intervention control by the intervention control device 410 and warning by the HMI 400 are performed (Step S203). Thereby, braking is applied to a vehicle moving to a movable body, and a warning is given to the driver of the vehicle. Warnings given to the driver of the vehicle include guidance for prompting steering operation for avoiding collision with a movable body, that is, guidance for prompting turning.

On the other hand, in Step S201, when the intersection point of the first time TTC and the second time TTV is determined not to belong to the intervention control area A22 in the assistance region A2, it is determined whether the intersection point belongs to the emergency intervention control area A23 (Step S204).

When the intersection point of the first time TTC and the second time TTV belongs to the emergency intervention control area A23 (Step S204: YES), a collision avoidance control amount, which is a control amount for urgently avoiding collision between the vehicle and a movable body, is calculated (Step S205). Next, based on the calculated collision avoidance control amount, emergency intervention control is performed by the intervention control device 410 and warning is given by the HMI 400 (Step S206). Thereby, hard braking is applied to the vehicle moving toward a movable body and warning is given to the driver of the vehicle. Warning to the driver of the vehicle includes guidance of sudden deceleration and guidance of steering operation for avoiding collision. Further, in most cases, by the time when the intersection point of the first time TTC and the second time TTV reaches the emergency intervention control area A23, the intersection point belongs to the HMI area A21 or the intervention control area A22. Therefore, ordinarily, prior to activation of hard braking, deceleration guidance is provided by the HMI 400 and braking is applied by the intervention control device 410. It is, thereby, possible to prevent the intersection point of the first time TTC and the second time TTV from belonging to the emergency intervention control area A23.

Further, on the other hand, at Step S204, the intersection point of the first time TTC and the second time TTV is determined not to belong to the emergency intervention control area A23 (Step S204: NO), the intersection point belongs to the HMI area A21. Accordingly, at this time, only HMI control is performed, and turning guidance and guidance for notifying the presence of a movable body are provided (Step S205).

Next, with reference to FIGS. 7 to 9, a description will be given of changes in the first time TTC and the second time TTV in the vehicle which is arbitrated via an arbitration process by the driving assistance apparatus and the driving assistance method of the present embodiment based on comparison with a comparative example.

Figure 7:
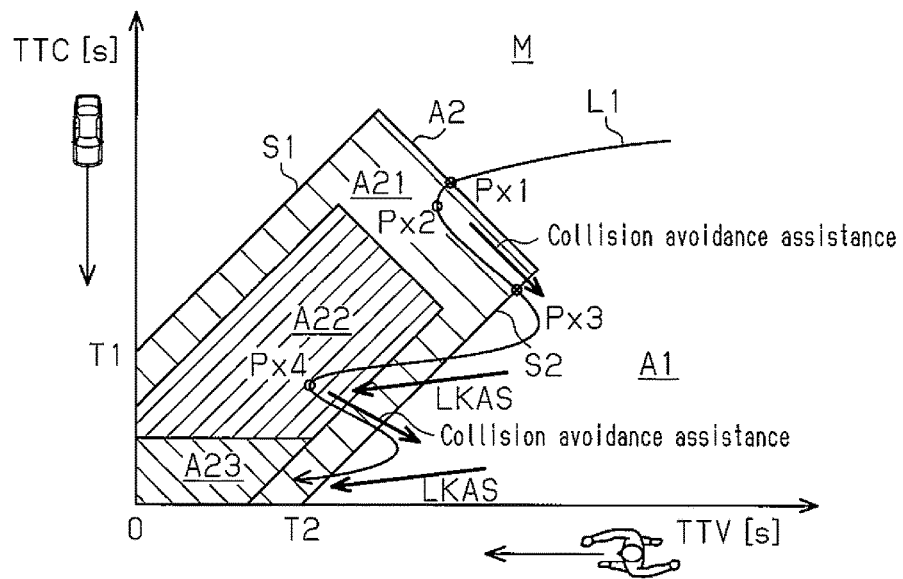
FIG. 7 is a drawing showing, as a comparative example, an example of changes in the first time and the second time when no arbitration is made.

As FIG. 7 shows a change L1 of the first time TTC and the second time TTV when no arbitration process is performed, the first time TTC and the second time TTV are found to belong to the assistance region A2 at a certain point Px1, by which collision avoiding assistance is performed. As a result, the assistance target vehicle is decelerated. Then, the change L1 of the first time TTC and the second time TTV moves from a point Px2 to a point Px3, which is positioned on a boundary line with the non-assistance region A1 (on straight line S2), thereby exiting the assistance region A2. That is, there is a greater time difference between arrival of the vehicle of an assistance target at a meeting point and arrival of a movable body present in the vicinity thereof at the meeting point.

In contrast, it is assumed that turning is performed by the lane keeping assistance in a direction conflicting that of the collision avoidance assistance before the lapse of a specified period of time from termination of the collision avoidance assistance due to the fact that the first time TTC and the second time TTV have exited the assistance region A2. Then, the intersection point of a change L1 from the first time TTC to the second time TTV moves from the non-assistance region A1 to a point Px4 that is positioned in the intervention control area A22. As a result, the first time TTC and the second time TTV, which have temporarily exited the assistance region A2, belong again to the assistance region A2. Then, due to the fact that the first time TTC and the second time TTV belong to the assistance region A2, the collision avoidance assistance is performed again, by which the change L1 from the first time TTC to the second time TTV moves from the point Px4 to exit the assistance region A2.

As described so far, in a comparative example with no arbitration, turning of the vehicle by the collision avoidance assistance and that by the lane keeping assistance are repeatedly prompted.

Figure 8:
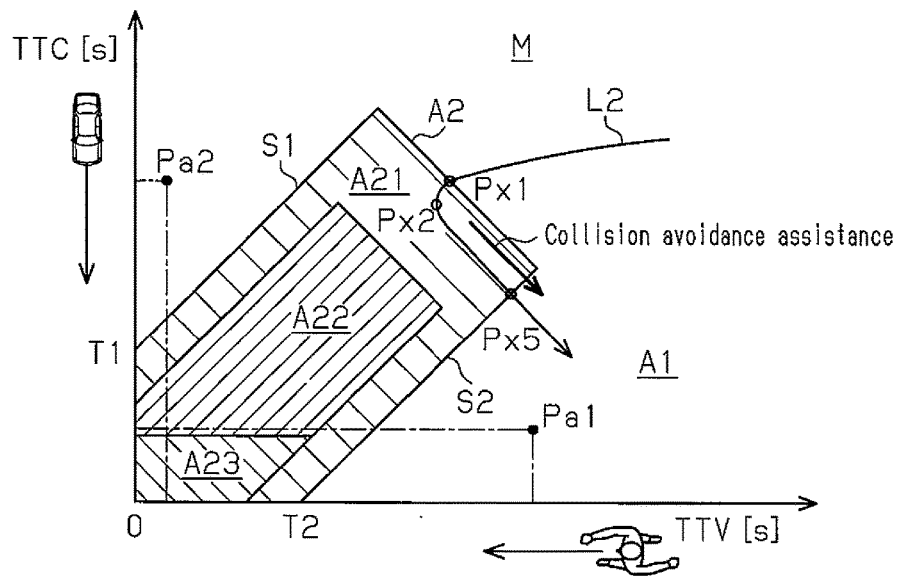
FIG. 8 is a drawing showing an example of changes in the first time and the second time when arbitration is made.

In contrast, with regard to a change L2 shown in FIG. 8, in the present embodiment, collision avoiding assistance is performed when the first time TTC and the second time TTV belong to the assistance region A2 at the certain point Px1. As a result, the assistance target vehicle is decelerated. Next, the change L2 of the first time TTC and the second time TTV moves from the point Px2 to a point Px5 on a straight line S1, exiting the assistance region A2.

Then, in the present embodiment, even after termination of the collision avoiding assistance due to the fact that the first time TTC and the second time TTV have exited from the assistance region A2 at the point Px5, time of activating acceleration assistance is delayed by the timing changing section 310. As a result, until the lapse of a specified period of time from termination of the collision avoidance assistance, activation of the lane keeping assistance is suppressed. Then, when the specified period of time has elapsed, activation of the lane keeping assistance is permitted to perform the lane keeping assistance by the lane-keeping assisting section 220.

Figure 9:
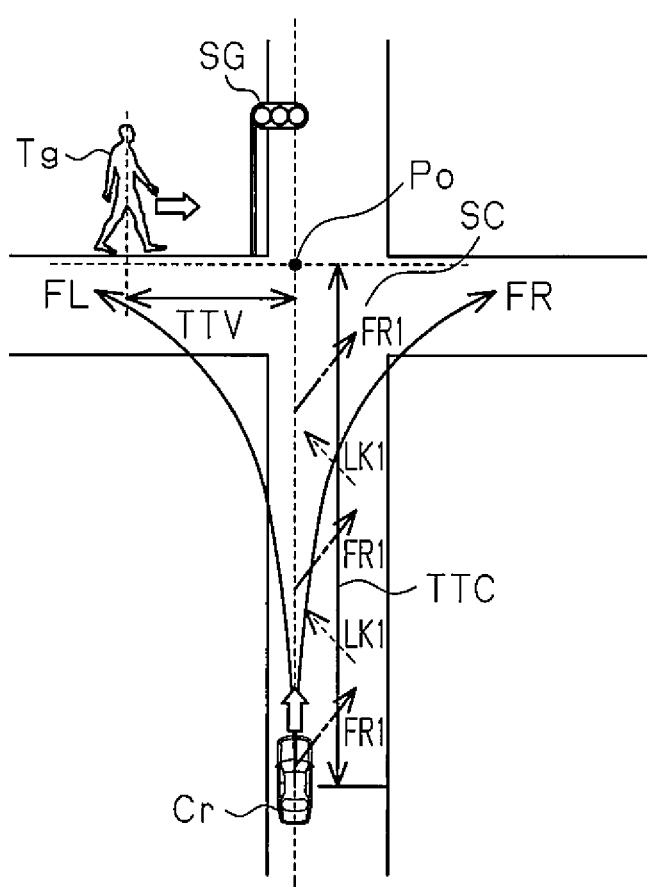
FIG. 9 is a diagram showing one example in which the movement path of a vehicle when arbitration is made and the movement path of a vehicle when no arbitration is made.

The arbitration is performed, so that, as represented by a change FR or a change FL indicated by solid lines in FIG. 9, when collision with a pedestrian Tg is predicted at the meeting point Po, toward which the vehicle Cr that is an assistance target advances, the vehicle is prompted to take a right turning or a left turning. Then, the right turning or the left turning is taken continuously until the position of the first time TTC and that of the second time TTV exit the assistance region A2, thereby ensuring the distance between the vehicle Cr and the pedestrian Tg to be a predetermined distance or more.

In contrast, if no arbitration is made, as represented by a change FR1 indicated by long dashed short dashed line also in FIG. 9, for example, after the right turning by the collision avoidance assistance is taken, as a change LK1 is indicated by the broken line also in FIG. 9, the lane keeping assistance, which prompts the left turning, is performed. Thereby, conflicting turnings of the vehicle Cr, that is, the right turning and the left turning are prompted repeatedly within a short period of time. However, such a problem is solved in the present embodiment.

As described so far, according to the driving assistance apparatus and the driving assistance method of the present embodiment, the following advantages are obtained.

(1) The assistance target vehicle is provided with the collision avoidance assisting section 210, which prompts turning of the vehicle to perform collision avoidance assistance for avoiding collision between the vehicle and an object. The vehicle is also provided with the assistance arbitration section 300, which arbitrates between collision avoidance assistance and driving assistance that is different in type from the collision avoidance assistance. Therefore, mutual interference between the collision avoidance assistance and the driving assistance different in type from the collision avoidance assistance or repeated performance of a plurality of types of driving assistance within a predetermined period of time is suppressed. Thereby, even a vehicle in which various types of driving assistance are performed is able to maintain appropriateness of each type of driving assistance.

(2) As the driving assistance different in type from the collision avoidance assistance, driving assistance that prompts turning of the assistance target vehicle is selected. Then, when turnings in the conflicting directions are prompted by the collision avoidance assistance and the driving assistance that is different in type from the collision avoidance assistance, the assistance arbitration section 300 performs suppression of the driving assistance that is different in type from the collision avoidance assistance. Therefore, the turning of the vehicle prompted by the collision avoidance assistance is suppressed from being cancelled by the turning prompted by the driving assistance different in type from the collision avoidance assistance. Alternate performance of the turning of the vehicle prompted by the collision avoidance assistance and the turning prompted by the driving assistance different in type from the collision avoidance assistance is also suppressed. Further, turnings in conflicting directions are alternately performed in a prompted manner is also suppressed. Still further, when a request for activating the collision avoidance assistance and a request for activating the driving assistance different in type from the collision avoidance assistance are made, assistance for avoiding collision between the assistance target vehicle and an object is preferentially performed to favorably maintain assistance functions by the collision avoidance assistance.

(3) In a period of time from start of collision avoidance assistance to termination of the collision avoidance assistance, the assistance arbitration section 300 performs suppression of the driving assistance different in type from the collision avoidance assistance. Thereby, during performance of the collision avoidance assistance, the driving assistance different in type from the collision avoidance assistance is not performed. Accordingly, the collision avoidance assistance, which is temporarily activated, is not performed simultaneously with the driving assistance different in type from the collision avoidance assistance, and mutual interference between these types of driving assistance is suppressed. Further, in a period of time from termination of the collision avoidance assistance until when the setup time elapses, the assistance arbitration section 300 performs suppression of the driving assistance different in type from the collision avoidance assistance. Accordingly, in a period of time from termination of the collision avoidance assistance until when the setup time elapses, a vehicle state that has been changed by the collision avoidance assistance is maintained, by which effects of the collision avoidance assistance are maintained until the distance between the vehicle and an object present in the vicinity thereof is ensured to be a predetermined distance or more. Accordingly, the vehicle state is not changed constantly due to performance of a plurality of types of driving assistance within a predetermined period of time, thereby suppressing a sense of discomfort experienced by the driver.

(4) The assistance arbitration section 300 is provided with the timing changing section 310, which performs the delay process for delaying the time of activating driving assistance different from collision avoidance assistance. Upon detection of a request for activating the driving assistance different from the collision avoidance assistance during performance of the collision avoidance assistance, the timing changing section 310 delays the time of activating the driving assistance different in type from the collision avoidance assistance. Therefore, performance of the collision avoidance assistance and the driving assistance different from the collision avoidance assistance within a specified period of time is suppressed. Further, the driving assistance different from the collision avoidance assistance, the activation of which is temporarily suspended, is performed after the lapse of a specified period of time from termination of the collision avoidance assistance. It is, thereby, possible to ensure the effects of the driving assistance by the driving assistance different from the collision avoidance assistance. Further, upon detection of a request for activating the driving assistance different from the collision avoidance assistance after performance of the collision avoidance assistance but before the lapse of set-up time, the timing changing section 310 performs, as arbitration, the delay process for delaying the time of activating the driving assistance different from the collision avoidance assistance. Therefore, performance of the respective types of driving assistance is suppressed, that is, the collision avoidance assistance and the driving assistance different from the collision avoidance assistance within the setup time. Still further, the driving assistance different from the collision avoidance assistance, activation of which is temporarily suspended, is performed after the lapse of set-up time, thereby ensuring also the effects of driving assistance by the driving assistance different from the collision avoidance assistance.

(5) A movable body such as a pedestrian Tg is selected as an object to be avoided by the assistant target vehicle. Based on the relationship between the first time taken by the vehicle to reach a meeting point of the assistance target vehicle and the movable body to be avoided and the second time taken by the movable body to reach the meeting point, the collision avoidance assisting section 210 performs assistance for avoiding collision between the vehicle and the movable body. Accordingly, the collision avoidance assisting section 210 is able to perform assistance for suppressing approach of the vehicle to the movable body at a stage prior to approach of the assistance target vehicle to the movable body within a predetermined distance range. It is, thereby, possible to suppress abnormal approach of the vehicle to the movable body by gradual deceleration not by requesting sudden braking or hard braking, but driving assistance is performed smoothly. Further, the collision avoidance assistance is arbitrated in relation to the driving assistance different from the collision avoidance assistance, thus making it possible to maintain assistance effects by the collision avoidance assistance at a high level.

(6) The collision avoidance assisting section 210 performs the collision avoidance assistance with reference to a map in which the assistance region A2 of performing driving assistance and the non-assistance region A1, in which driving assistance is not performed, are specified for a relative relationship between the first time TTC and the second time TTV. Therefore, it is determined whether the collision avoidance assistance should be activated in accordance with whether the first time TTC and the second time TTV based on the vehicle and the movable body present in the vicinity thereof belong to either the assistance region A2 or the non-assistance region A1 in the map M. It is, thereby, possible to easily determine whether to activate the collision avoidance assistance.

(7) The assistance arbitration section 300 performs arbitration for lane-keeping travel assistance for prompting the vehicle to keep its traveling position within a lane in terms of driving assistance different in type from the collision avoidance assistance. Therefore, mutual interference between the collision avoidance assistance and the lane keeping assistance or alternate performance of the collision avoidance assistance and the lane keeping assistance is suppressed.

(8) Based on a relationship between the first time TTC taken by a vehicle of an assistance target to reach a meeting point Po of a movement path of the vehicle and a movement path of a movable body and the second time TTV taken by the movable body to reach the meeting point Po, the collision avoidance assisting section 210 performs assistance in avoidance of collision between the vehicle and the movable body. Thereby, it is more likely to suppress near collision between the vehicle and the movable body by slowly deceleration without requesting hard braking, abrupt braking operation or the like. Therefore, driving assistance can be performed smoothly.

(9) The collision avoidance assisting section 210 is provided with the map storage section 213, which records the map M in which the assistance region A2 for performing driving assistance and the non-assistance region A1 for performing no driving assistance are specified for a relative relationship between the first time TTC and the second time TTV. Then, the collision avoidance assisting section 210 performs the collision avoiding assistance with reference to the map M. Therefore, the collision avoidance assisting section 210 is able to determine whether activation of the collision avoiding assistance is needed based whether the intersection point of the first time TTC and the second time TTV based on a vehicle of an assistance target and a movable body present in the vicinity thereof belongs to the assistance region A2 or the non-assistance region A1 in the map M. Thereby, it is possible to easily determine whether activation of the collision avoiding assistance is needed.

(10) The assistance region A2 of the map M is divided into the HMI area A21, the intervention control area A22 and the emergency intervention control area A23 in accordance with urgency. Further, the driving assisting section 200 performs different types of driving assistance based whether a relative relationship between the first time TTC and the second time TTV of the assistance target vehicle belongs the HMI area A21, the intervention control area A22, or the emergency intervention control area A23. Accordingly, driving assistance is set in accordance with the urgency of each of the thus divided areas, by which driving assistance of such a level, that is, in accordance with a relative positional relationship between the assistance target vehicle and a movable body is performed. It is, thereby, possible to perform appropriateness of activation of the driving assistance in accordance with each level.

Second Embodiment

Figure 10:
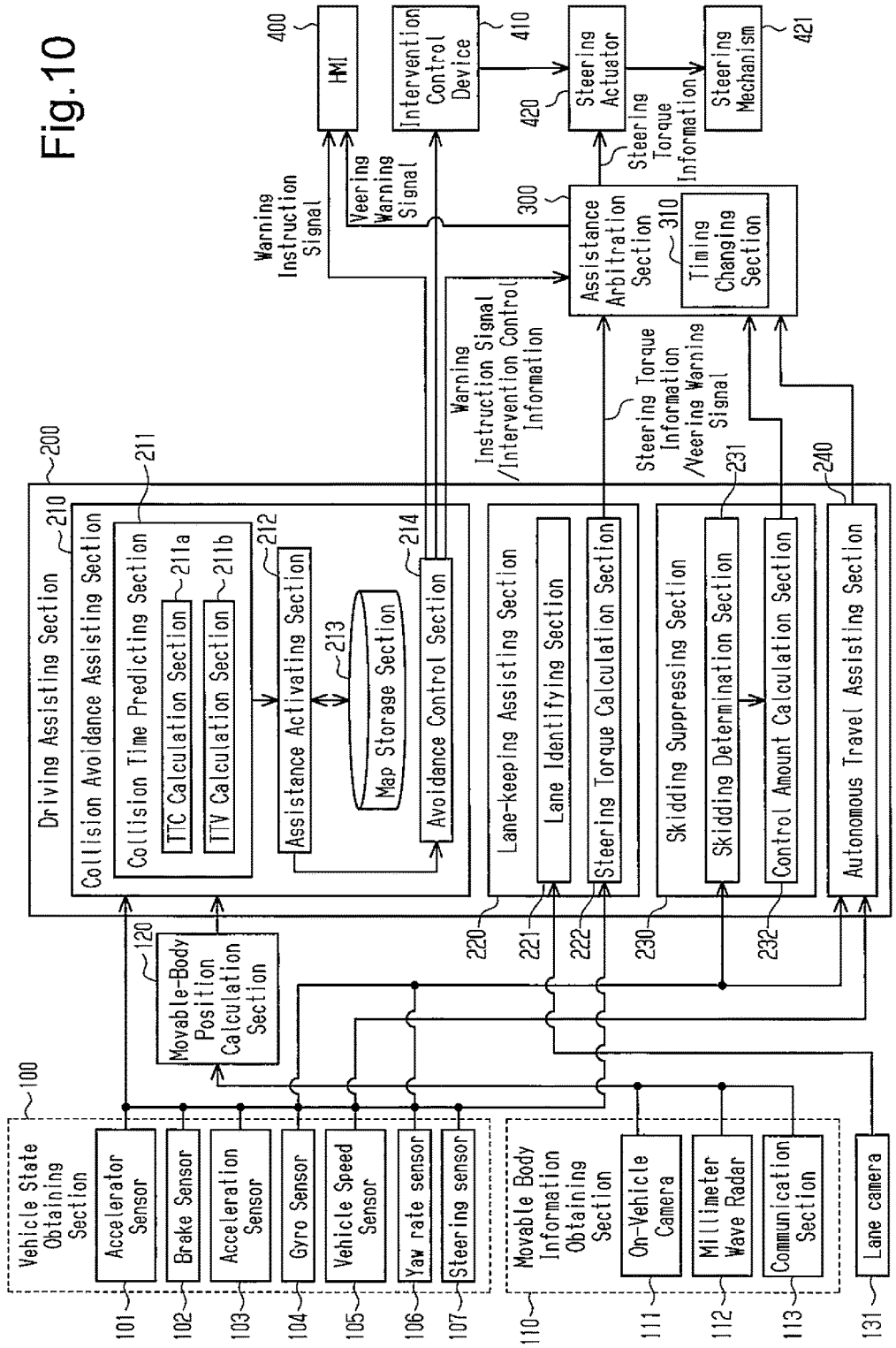
FIG. 10 is a block diagram showing a schematic configuration of a vehicle to which a driving assistance apparatus and a driving assistance method of a second embodiment are applied.

Next, a driving assistance apparatus and a driving assistance method according to a second embodiment of the present invention will be described with reference to FIG. 10, with an emphasis given to differences from the first embodiment. The driving assistance apparatus and the driving assistance method according to the present embodiment are also similar in basic configuration to those of the first embodiment. In FIG. 10, elements substantially the same as those of the first embodiment will be given the same reference numerals, with a redundant description omitted.

As shown in FIG. 10, the driving assisting section 200A of the present embodiment is provided with a skidding suppressing section 230, which performs skidding suppressing assistance for assisting in suppressing a vehicle that is an assistance target from skidding. Further, the driving assisting section 200A is provided with an autonomous travel assisting section 240, which performs autonomous travel assistance for assisting autonomous travel of the assistance target vehicle.

The skidding suppressing section 230 is provided with a skidding determination section 231, which determines possible occurrence of skidding based on results detected, for example, by the gyro sensor 104 and the yaw rate sensor 106. The skidding suppressing section 230 is also provided with a control amount calculation section 232, which calculates a control amount for suppressing skidding based on a determination result of the skidding determination section 231.

When a determination is made to the effect that skidding has occurred or there is a high probability of skidding occurring based on the results detected by the gyro sensor 104 and the yaw rate sensor 106, the skidding determination section 231 outputs the result of the determination to the effect thereof to the control amount calculation section 232.

Upon input of the result of the determination to the effect that skidding has occurred or there is a high probability of skidding occurring, the control amount calculation section 232 calculates a control amount for suppressing skidding. As the control amount, for example, the deceleration amount of the vehicle and the turning amount are calculated. Then, the control amount calculation section 232 outputs a control instruction that indicates the thus calculated control amount to the assistance arbitration section 300.

The autonomous travel assisting section 240 calculates a control amount for performing autonomous traveling based on information that can be obtained from the vehicle state obtaining section 100, the movable body information obtaining section 110 and the lane camera 131. As the control amount, the acceleration amount, the deceleration amount, the turning amount, and the like of the vehicle are calculated. Then, the autonomous travel assisting section 240 outputs a control instruction that indicates the thus calculated control amount to the assistance arbitration section 300.

The timing changing section 310, which forms the assistance arbitration section 300 of the present embodiment, also determines whether the turning direction that is indicated by an intervention control signal or a warning instruction signal input from the avoidance control section 214 of the collision avoidance assisting section 210 is the same direction as the turning direction indicated by a control amount output by the skidding suppressing section 230 or the autonomous travel assisting section 240.

When the turning directions of these types of assistance are determined to be different from each other, the timing changing section 310 performs a process for delaying activation of assistance other than the collision avoidance assistance. Then, after the lapse of a specified period of time from termination of the collision avoidance assistance, the timing changing section 310 outputs to the HMI 400, the intervention control device 410, and the like, information that indicates a control amount output from the skidding suppressing section 230 or the autonomous travel assisting section 240. Then, in the HMI 400, the intervention control device 410, and the like, after the lapse of a predetermined period of time from termination of the collision avoidance assistance, the skidding suppressing assistance and the autonomous travel assistance are performed. Accordingly, assistance is performed with a priority given to the collision avoidance assistance even in a vehicle in which a plurality of types of assistance such as the collision avoidance assistance, the lane keeping assistance, the skidding suppressing assistance and the autonomous travel assistance are performed. Thus, the driving assistance is performed appropriately.

Further, even when none of the intervention control signal or the warning instruction signal is input from the avoidance control section 214 to the collision avoidance assisting section 210 but when information that indicates a control amount is input from at least two of the lane-keeping assisting section 220, the skidding suppressing section 230 and the autonomous travel assisting section 240, the timing changing section 310 arbitrates between these sections. That is, the timing changing section 310 also arbitrates between the lane keeping assistance, the skidding suppressing assistance and the autonomous travel assistance.

Upon arbitration, the timing changing section 310 determines whether the turning directions indicated by the control amounts are the same direction. Next, when the timing changing section 310 determines that the turning directions shown by the control amounts are different, arbitration is made based on, for example, a predetermined priority and the sizes of the control amounts. Then, the timing changing section 310 outputs to the HMI 400, the intervention control device 410, and the like, for example, a control amount of assistance that is determined to be high in priority and a control amount of assistance that is determined to be relatively great in control amount as comparison results. Then, the assistance that is determined to be high in priority or the assistance based on a control amount that is determined to be relatively great is performed.

After the lapse of a specified period of time, the timing changing section 310 outputs to the HMI 400, the intervention control device 410, and the like, for example, a control amount of assistance low in priority and a control amount of assistance which is determined to be relatively small in control amount as comparison results. As a result, after the lapse of a specified period of time from performance of the assistance determined to be high in priority or the assistance based on a control amount determined to be relatively great, the assistance determined to be low in priority or the assistance based on a control amount determined to be relatively small is performed. Accordingly, assistance is performed, with priority given to the collision avoidance assistance even in a vehicle in which a plurality of types of assistance such as the lane keeping assistance, the skidding suppressing assistance, and the autonomous travel assistance are performed. It is, thus, possible to appropriately perform the driving assistance.

As described so far, according to the driving assistance apparatus and the driving assistance method of the present embodiment, not only the above described advantages of (1) to (10) but also the following advantages are obtained.

(11) The driving assisting section 200A is additionally provided, as assistance elements, with a skidding suppressing section 230 and an autonomous travel assisting section 240. Thereby, even in a vehicle in which the collision avoidance assistance, the lane keeping assistance, the skidding suppressing assistance, and the autonomous travel assistance are performed, these types of assistance are arbitrated to suppress repeated performance of the types of assistance for prompting mutually opposite turning.

(12) When at least one of the collision avoidance assistance, the lane keeping assistance, the skidding suppressing assistance, and the autonomous travel assistance is performed, the collision avoidance assistance is preferentially activated. Thus, collision avoidance is preferentially performed.

(13) The assistance arbitration section 300 arbitrates between the respective types of assistance performed by the lane-keeping assisting section 220, the skidding suppressing section 230 or the autonomous travel assisting section 240. Therefore, the lane keeping assistance, the skidding suppressing assistance and also the autonomous travel assistance are prevented from being activated in a conflicting manner within a specified period of time are suppressed. Thereby, these types of assistance are suppressed from cancelling each other.

(14) The timing changing section 310 arbitrates between the respective types of assistance performed by the lane-keeping assisting section 220, the skidding suppressing section 230 or the autonomous travel assisting section 240 corresponding to a specified priority. Thereby, assistance higher in priority is preferentially activated. Further, the respective types of assistance performed by the lane-keeping assisting section 220, the skidding suppressing section 230 or the autonomous travel assisting section 240 are arbitrated based on a control amount that is relatively great. Thereby, driving assistance that is estimated to be of a high need due to a great control amount is preferentially activated. Thus, while a plurality of types of driving assistance is arbitrated, the driving assistance to be activated is prompted to be made suitable for traveling environments of the vehicle.

Third Embodiment

Figure 11:
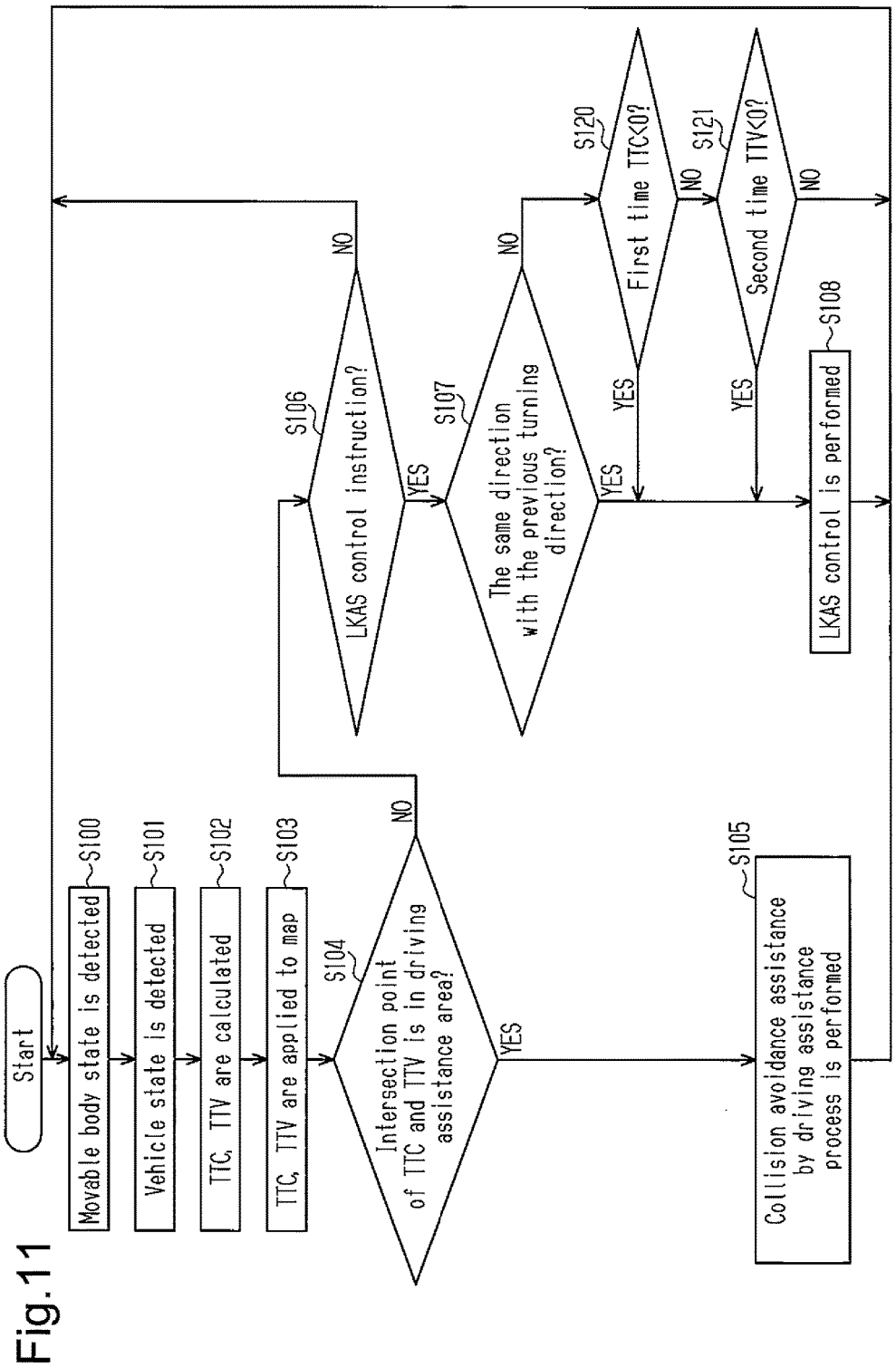
FIG. 11 is a flowchart showing one example of an arbitration process in a driving assistance apparatus and a driving assistance method according to a third embodiment of the present invention.

Next, a description will be given of a driving assistance apparatus and a driving assistance method of a third embodiment in the present invention, with an emphasis given to differences from those of the first embodiment with reference to FIG. 11. The driving assistance apparatus and the driving assistance method of the present embodiment are also similar in basic configuration to those of the first embodiment. In FIG. 11 as well, elements substantially the same as those of the first embodiment are given individually the same reference numerals, with a redundant description omitted.

As shown in FIG. 11, when a determination has been made in Step S107 shown in FIG. 5 that collision avoidance assistance and lane keeping assistance are such types of assistance that turning directions thereof are conflicting (Step S107: NO), a timing changing section 310 of the present embodiment determines whether a first time TTC is less than 0 (Step S120). That is, the timing changing section 310 determines whether the first time TTC has been converted from a positive value to a negative value.

Then, for example, when a vehicle Cr that is an assistance target as illustrated in FIG. 2 passes through a meeting point Po and the first time TTC is less than 0 (Step S120: YES), there is low probability that collision avoidance assistance will be activated again. Thereby, it is permitted to perform LKAS control by lane keeping assistance (Step S108).

In contrast, when the first time TTC is greater than or equal to 0 (Step S120: NO), the timing changing section 310 determines whether a second time TTV is less than 0 (Step S121). That is, the timing changing section 310 determines whether the second time TTV has been converted from a positive value to a negative value.

Then, when, for example, a movable body illustrated in FIG. 2 passes through the meeting point Po and, thereby, the second time TTV has become less than 0 (Step S121: YES), there is low probability that the collision avoidance assistance will be activated again. It is thus permitted to perform the LKAS control by the lane keeping assistance (Step S108).

When the second time TTV is greater than or equal to 0 (Step S121: NO), activation of lane keeping assistance is suppressed to terminate this process.

As described so far, according to the driving assistance apparatus and the driving assistance method of the present embodiment, the above described advantages of (1) to (10) are obtained and the following advantages are also obtained.

(15) When turning by the collision avoidance assistance and the lane keeping assistance is performed in conflicting directions within a specified period of time, performance of LKAS control by the lane keeping assistance has been permitted on condition that the first time TTC is less than 0. Thereby, when the vehicle Cr, which is an assistance target, passes through a meeting point Po with a pedestrian Tg or a advancing direction is changed and there is low probability that the collision avoidance assistance is activated, performance of the LKAS control is permitted. Thereby, in a situation where there is low probability that the collision avoidance assistance and the lane keeping assistance will be performed alternately, the lane keeping assistance is performed before the lapse of a specified period of time. And, assistance advantages by the lane keeping assistance are favorably maintained.

(16) When the directions of turning performed within a specified period of time by the collision avoidance assistance and the lane keeping assistance are different from each other, performance of the LKAS control by the lane keeping assistance has been permitted on condition that the second time TTV is less than 0. Thereby, when there is low probability that a pedestrian Tg present ahead of the vehicle Cr, which is an assistance target, in the advancing direction will pass through the meeting point Po and there is low probability that the collision avoidance assistance will be activated by the change in advancing direction, performance of LKAS control is permitted. Accordingly, in a situation where there is low probability that the collision avoidance assistance and the lane keeping assistance will be performed alternately, the lane keeping assistance is performed before the lapse of a specified period of time. And, assistance advantages by the lane keeping assistance are favorably maintained.

Fourth Embodiment

Figure 12:
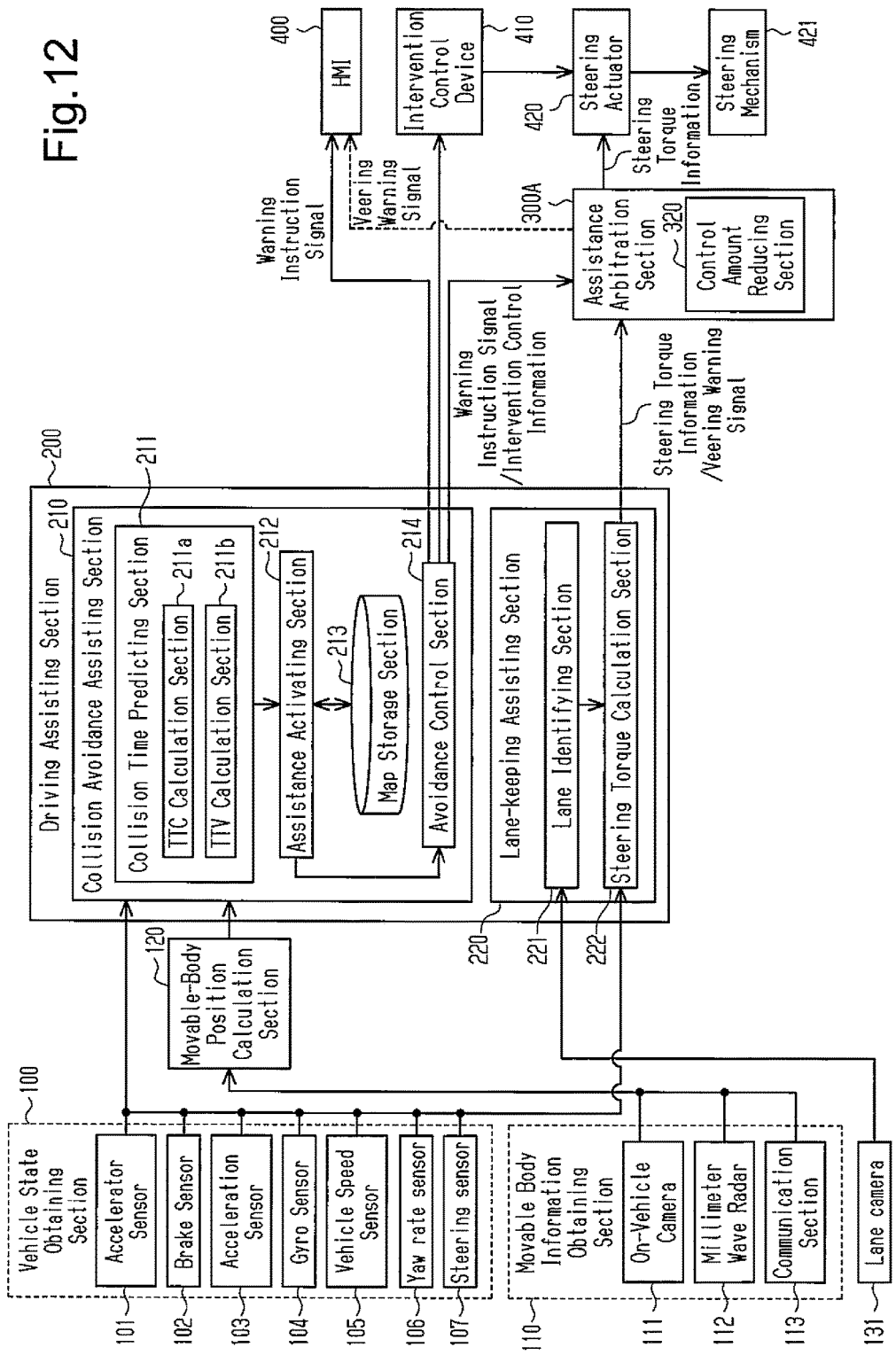
FIG. 12 is a block diagram showing a schematic configuration of a vehicle to which are applied a driving assistance apparatus and a driving assistance method according to a fourth embodiment of the present invention.
Figure 13:
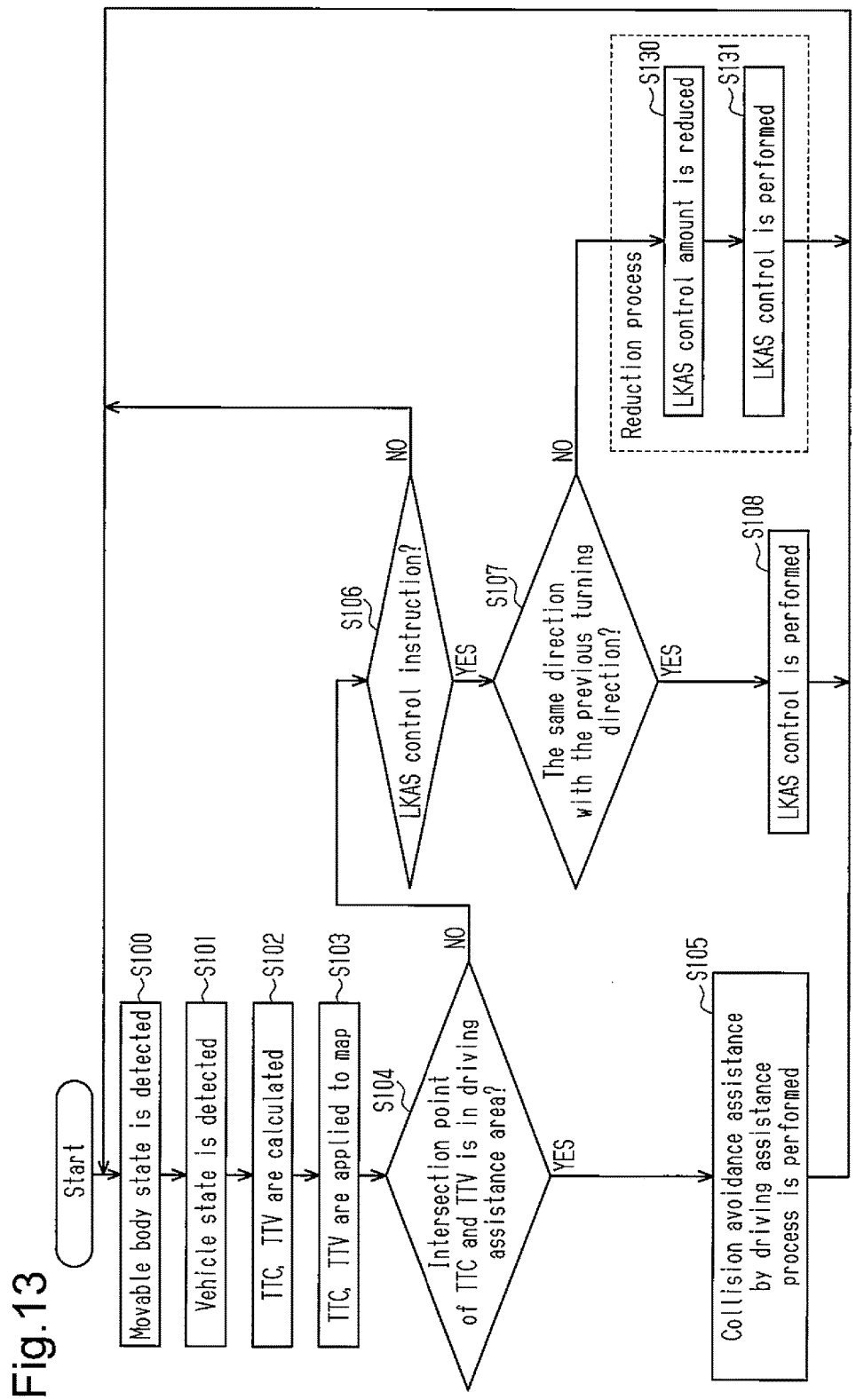
FIG. 13 is a flowchart showing one example of an arbitration process in this embodiment.

Next, a description will be given of a driving assistance apparatus and a driving assistance method of a fourth embodiment in the present invention, with an emphasis given to differences from those of the first embodiment with reference to FIGS. 12 and 13. The driving assistance apparatus and the driving assistance method of the present embodiment are also similar in basic configuration to those of the first embodiment. In FIGS. 12 and 13, elements substantially the same as those of the first embodiment are given individually the same reference numerals, with a redundant description omitted.

As shown in FIG. 12, in place of the above-described timing changing section 310, an assistance arbitration section 300A of the present embodiment is provided with a control amount reducing section 320, which performs, as an arbitration, a process for reducing a control amount of steering torque calculated by a lane-keeping assisting section 220.

The control amount reducing section 320 determines whether the turning direction by the collision avoidance assistance performed by a collision avoidance assisting section 210 is the same direction as the turning direction by the lane keeping assistance performed by the lane-keeping assisting section 220. Then, when the thus determined turnings are in the conflicting directions, the control amount reducing section 320 reduces the control amount of steering torque calculated by the lane-keeping assisting section 220. The control amount reducing section 320 outputs the reduced control amount of steering torque to an HMI 400, a steering actuator 420, and the like. As a result, the lane keeping assistance based on the thus reduced steering torque is performed by the HMI 400, the steering actuator 420, and the like.

Next, operation of the driving assistance apparatus and the driving assistance method of the present embodiment will be described with reference to FIG. 13.

As shown in FIG. 13, when the directions of turning performed by various types of assistance are determined to be different in Step S107 (Step S107: NO), the control amount reducing section 320 performs a process that reduces a control amount of steering torque by the lane-keeping assisting section 220 (Step S130). Next, based on the reduced control amount of steering torque, the LKAS control is performed (Step S131).

In the present embodiment, Steps S130 and S131 correspond to the above-described reduction process.

As so far described, according to the driving assistance apparatus and the driving assistance method of the present embodiment, the advantages described in (1) to (10) are obtained and the following advantages are obtained in place of (4).

(4A) The assistance arbitration section 300A is provided with the control amount reducing section 320, which reduces a control amount used in the lane keeping assistance. When the collision avoidance assistance and the lane keeping assistance prompt turnings that are different from each other, the control amount reducing section 320 performs a process for reducing a control amount used in the lane keeping assistance. Therefore, when a request for activating the lane keeping assistance is made after termination of the collision avoidance assistance, activation of the lane keeping assistance based on the reduce control amount is permitted. Thereby, at the time of making the request for activating the lane keeping assistance, the lane keeping assistance is performed in the minimum range. Thereby, the collision avoidance assistance is arbitrated in relation to the lane keeping assistance by correcting the control amount.

Fifth Embodiment

Figure 14:
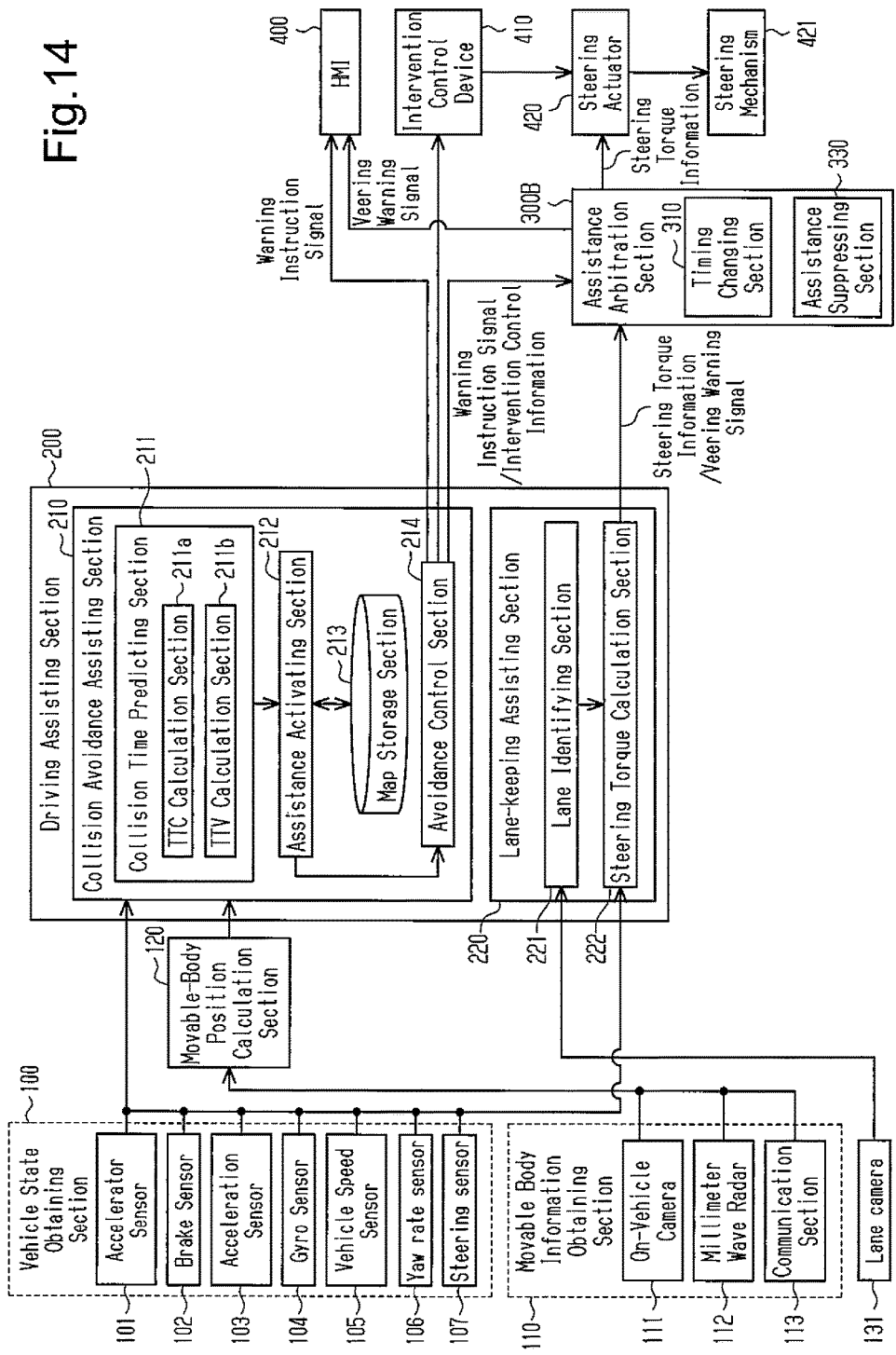
FIG. 14 is a block diagram showing a schematic configuration of a vehicle to which are applied a driving assistance apparatus and a driving assistance method according to a fifth embodiment of the present invention.
Figure 15:
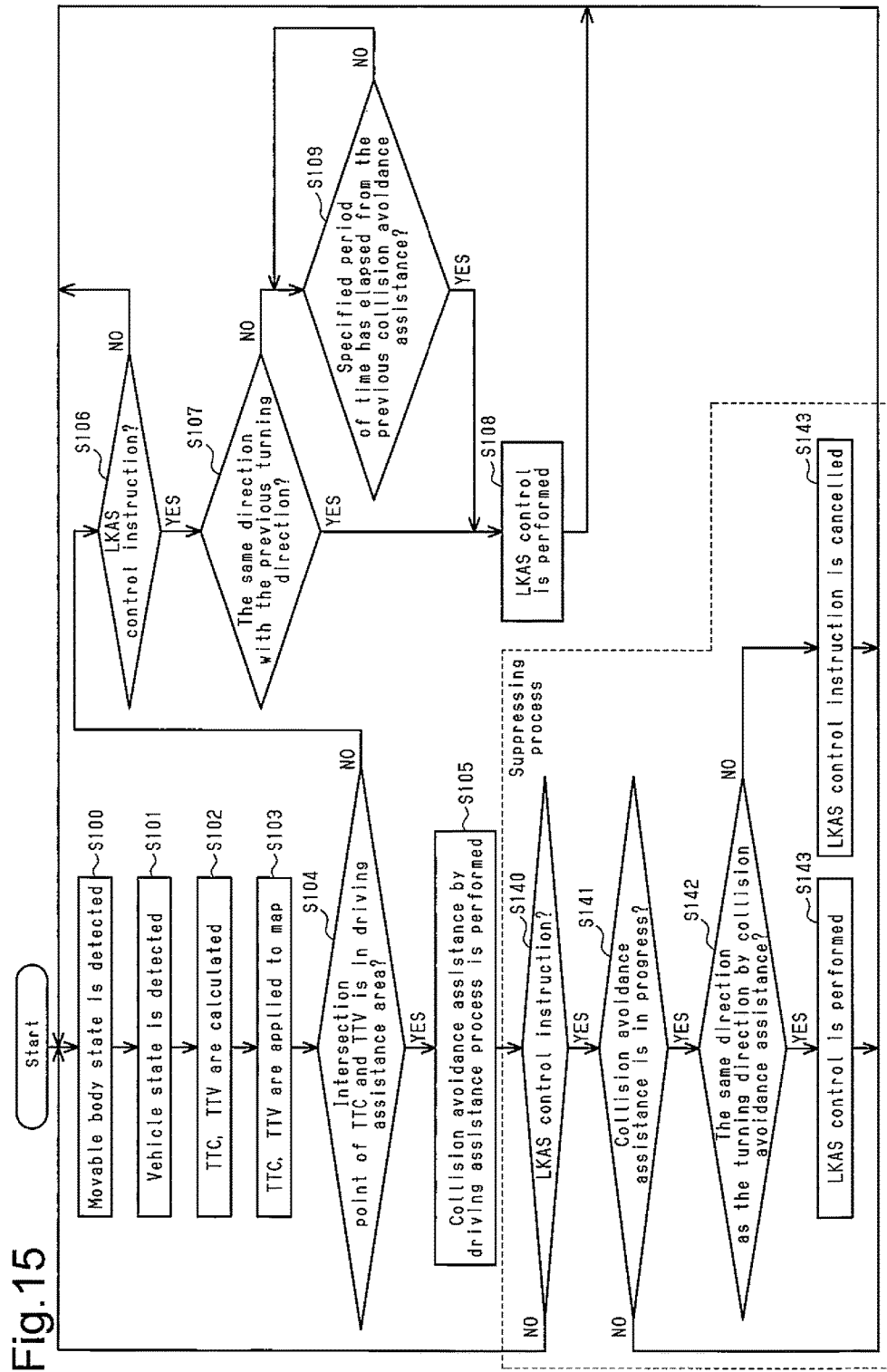
FIG. 15 is a flowchart showing one example of an arbitration process in the same embodiment.

Next, a description will be given of a driving assistance apparatus and a driving assistance method of a fifth embodiment in the present invention, with an emphasis given to differences from those of the first embodiment with reference to FIGS. 14 and 15. The driving assistance apparatus and the driving assistance method of the present embodiment are also the same in basic configuration to those of the first embodiment. In FIGS. 14 and 15 as well, elements substantially the same as those of the first embodiment are given individually the same reference numerals, with a redundant description omitted.

As shown in FIG. 14, an assistance arbitration section 300B of the present embodiment is additionally provided with an assistance suppressing section 330, which suppresses activation of assistance other than collision avoidance assistance based when a suppressing condition is met.

The assistance suppressing section 330 monitors a performance state of collision avoidance assistance based on a warning instruction signal or intervention control information input from a collision avoidance assisting section 210. Then, when an LKAS control instruction for prompting turning that conflict the turning by collision avoidance assistance is input from a lane-keeping assisting section 220 during performance of the collision avoidance assistance, the assistance suppressing section 330 performs a process for cancelling the LKAS control instruction by assuming that the suppressing condition of the lane keeping assistance has been met.

In contrast, the LKAS control instruction, which has been input after performance of the collision avoidance assistance, is processed by a timing changing section 310. After the lapse of a specified period of time from termination of performance of the collision avoidance assistance, the LKAS control instruction is output to an HMI 400, a steering actuator 420, and the like.

Hereinafter, operation of the driving assistance apparatus and the driving assistance method of the present embodiment will be described with reference to FIG. 15.

As shown in FIG. 15, when a request for activating the lane keeping assistance is made in Step S105 after the start of performing collision avoidance assistance (Step S140: YES), it is determined whether the collision avoidance assistance is terminated (Step S141).

Then, when the collision avoidance assistance is determined to be in progress (Step S141: YES), it is determined whether the turning by the collision avoidance assistance is in the same direction as the turning by the lane keeping assistance (Step S142).

Then, when the turning directions by these types of assistance are determined to be the same directions (Step S142: YES), the lane keeping assistance, the activation of which has been requested in Step S140, is performed (Step S143).

In contrast, when the turning directions are determined to be different (Step S142: NO), the request for activation made in Step S140, that is, the LKAS control instruction input into the assistance arbitration section 300B, is cancelled (Step S143). In the present embodiment, the process described in Step S140 to S143 corresponds to the above-described suppressing process.

Then, when the request for activating the lane keeping assistance is made again after termination of the collision avoidance assistance, the lane keeping assistance is performed after the lapse of a specified period of time (Steps S106 to S109).

Further, when performance of the collision avoidance assistance is determined to be terminated in Step S141 (Step S141: NO), the lane keeping assistance is performed after the lapse of a specified period of time (Steps S106 to S109).

As so far described, according to the driving assistance apparatus and the driving assistance method of the present embodiment, the advantages of (1) to (10) are obtained and the following advantages are also obtained.

(17) The assistance arbitration section 300B is provided with the assistance suppressing section 330, which suppresses activation of the lane keeping assistance. When a request for activating the lane keeping assistance is made during performance of the collision avoidance assistance, the assistance suppressing section 330 cancels the request for activating the lane keeping assistance if the suppressing condition is met. Thereby, interference by the lane keeping assistance during performance of the collision avoidance assistance is suppressed. The lane keeping assistance is performed when the request for activation is made again after performance of the collision avoidance assistance. Accordingly, only the lane keeping assistance, which is determined to be of a high need even after termination of performance of the collision avoidance assistance, is performed to suppress activation of the lane keeping assistance which is no longer needed.

Sixth Embodiment

Next, a description will be given of a driving assistance apparatus and a driving assistance method of a sixth embodiment in the present invention, with an emphasis given to differences from those of the first embodiment with reference to FIGS. 16 to 19. The driving assistance apparatus and the driving assistance method of the present embodiment are also the same in basic configuration to those of the first embodiment. In FIGS. 16 to 19 as well, elements substantially the same as those of the first embodiment are given individually the same reference numerals, with a redundant description omitted.

Figure 16:
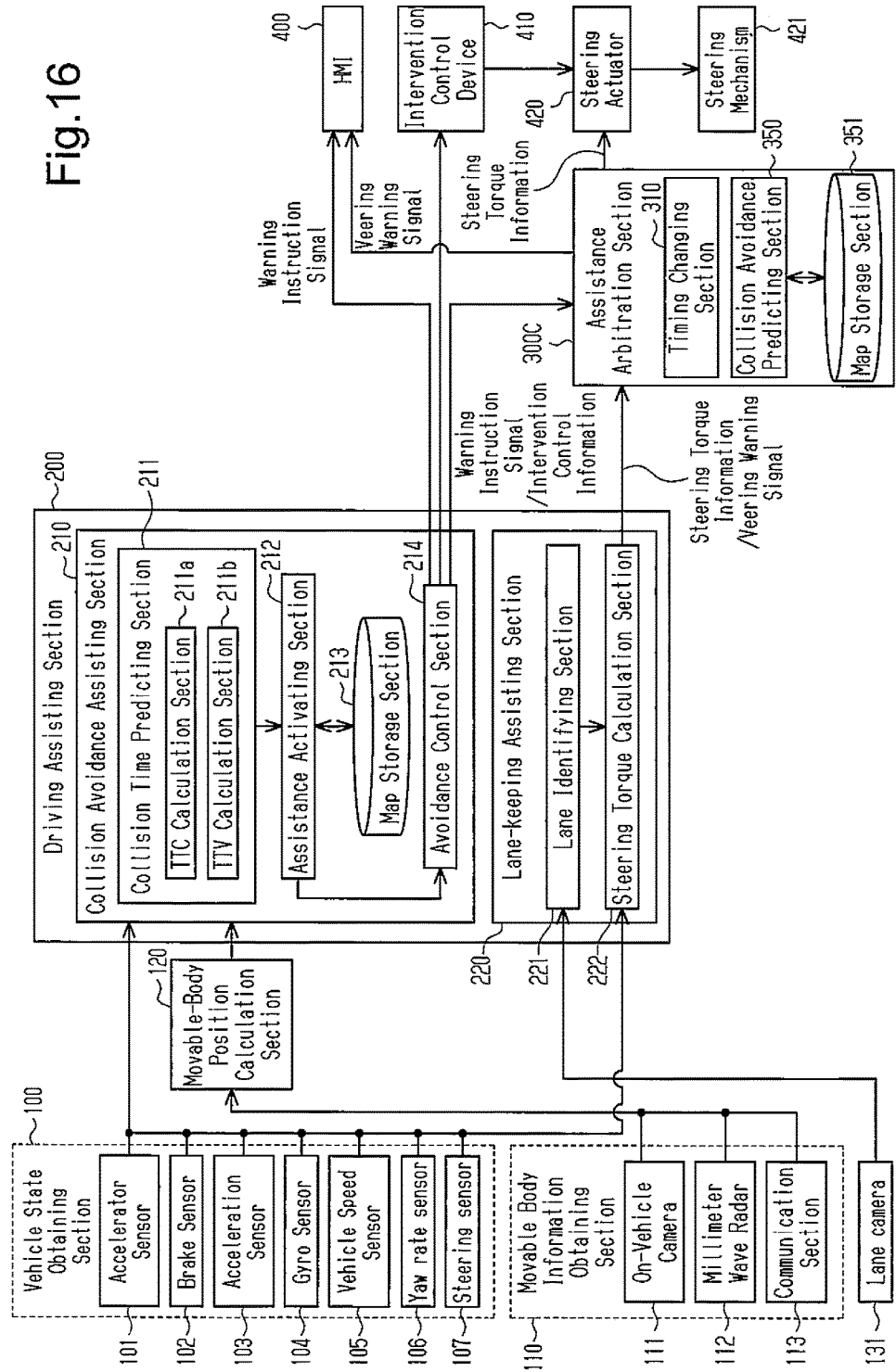
FIG. 16 is a block diagram showing a schematic configuration of a vehicle to which are applied a driving assistance apparatus and a driving assistance method according to a sixth embodiment of the present invention.

As shown in FIG. 16, an assistance arbitration section 300C of the present embodiment is provided with a collision avoidance predicting section 350, which predicts activation of collision avoidance assistance, and a map storage section 351, which stores a map used in prediction. Upon input of information on steering torque or a veering warning signal input from a steering torque calculation section 222, the collision avoidance predicting section 350 obtains information that indicates a first time TTC and a second time TTV from a TTC calculation section 211a and a TTV calculation section 211b of a collision avoidance assisting section 210. Then, the collision avoidance predicting section 350 predicts activation of the collision avoidance assistance based on the thus obtained information on the first time TTC and the second time TTV and the map stored at the map storage section 351.

When a determination is made as a result of prediction that it is highly probable that the collision avoidance assistance will be activated, the collision avoidance predicting section 350 cancels the information on steering torque and the veering warning signal input from the lane-keeping assisting section 220, thereby suppressing activation of the lane keeping assistance.

In contrast, when a determination is made as a result of prediction that there is a low probability that the collision avoidance assistance will be activated, the collision avoidance predicting section 350 outputs the information on steering torque and the veering warning signal input from the lane-keeping assisting section 220 to a steering actuator 420 and an HMI 400, thereby permitting activation of the lane keeping assistance.

Next, with reference to FIGS. 17 and 18, a detailed description will be given of a prediction mode of the collision avoidance assistance by the collision avoidance predicting section 350 of the present embodiment.

Figure 17A:
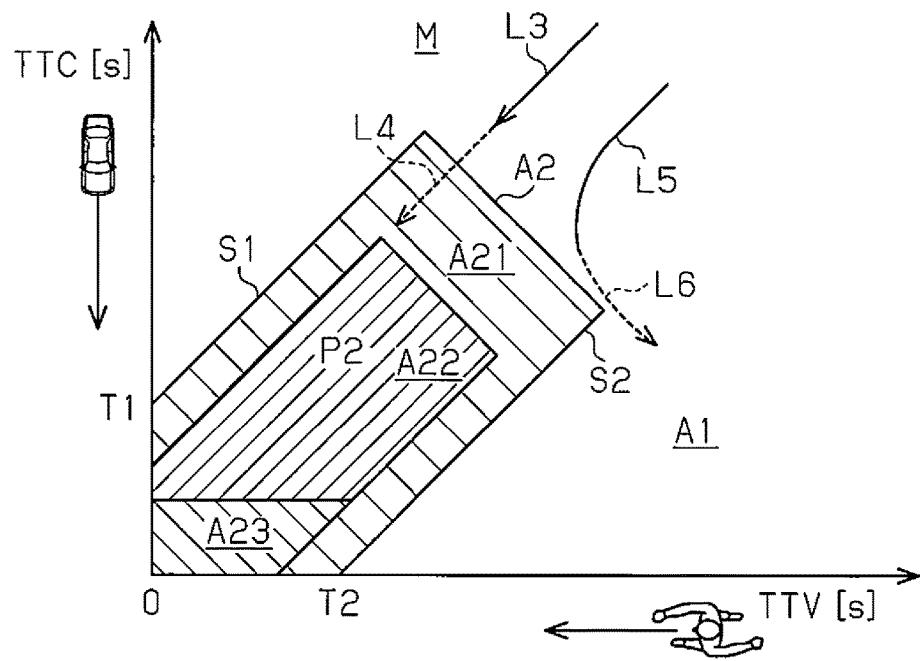
FIG. 17A is a diagram showing one example of the movement path of a first time and that of a second time, which are predicted based on linear prediction.

As illustrated in FIG. 17A, when each of the path of the first time TTC and that of the second time TTV is a change L3 indicated by a solid line, the collision avoidance predicting section 350 estimates based on, for example, linear prediction, that the first time TTC and the second time TTV in the future will form a change L4 indicated by a broken line. Then, the collision avoidance predicting section 350 determines that there is a high probability that the collision avoidance assistance will be activated due to the fact that the estimated change L4 belongs to the assistance region A2, thereby suppressing activation of the lane keeping assistance.

On the other hand, as illustrated in FIG. 17A, when each of the path of the first time TTC and that of the second time TTV is a change L5 indicated by a solid line, the collision avoidance predicting section 350 estimates based on, for example, linear prediction, that the first time TTC and the second time TTV in the future will form a change L6 indicated by a broken line. Then, the collision avoidance predicting section 350 determines that there is low probability that the collision avoidance assistance will be activated due to the fact that the estimated change L6 does not belong to the assistance region A2, thereby permitting the activation of the lane keeping assistance.

Figure 17B:
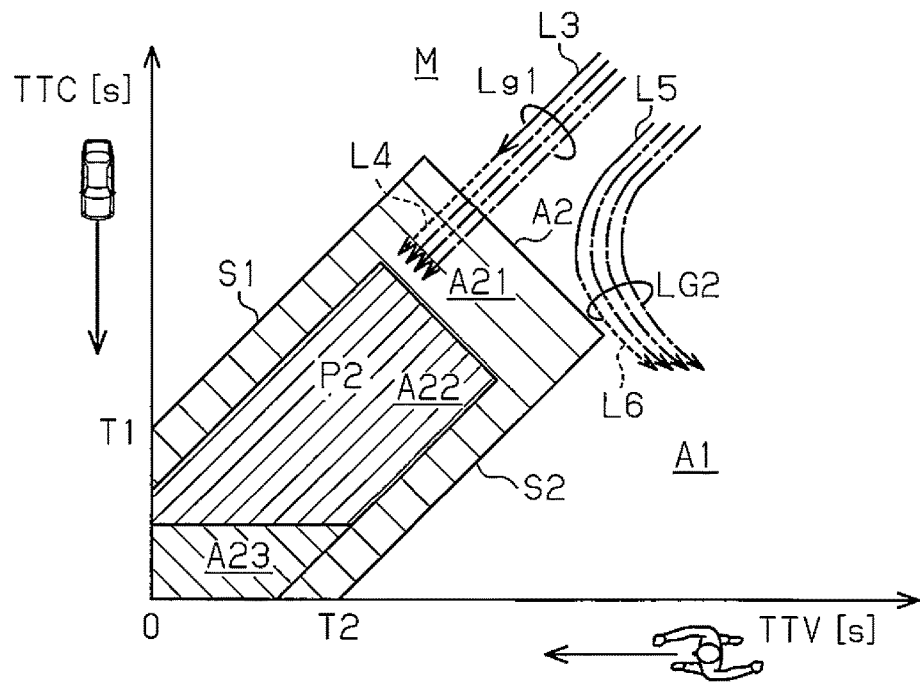
FIG. 17B is a diagram showing one example of the movement path of the first time and that of the second time, which are predicted based on statistical distribution.

As shown in FIG. 17B, in a determination method different from that of FIG. 17A, it is assumed that a plurality of change groups Lg1 and Lg2 are recorded in a map storage section 351 as a change from the first time TTC to the second time TTV obtained from a vehicle that is an assistance target and other vehicles.

Among these change groups, the change group Lg1 makes such a change that the movement path of the first time TTC and that of the second time TTV change from the non-assistance region A1 to the assistance region A2. In contrast, the change group Lg2 makes such a change that the movement path of the first time TTC and that of the second time TTV bend midway to avoid the assistance region A2 and belong to only the non-assistance region A1.

Then, the collision avoidance predicting section 350 determines that there is a high probability that the change L3 will follow the change L4 as with the change group Lg1 due to the fact that the change L3 of the vehicle belongs to the change group Lg1. That is, since the change group Lg1, which is a statistical distribution of the first time TTC and the second time TTV, changes from the non-assistance region A1 to the assistance region A2, the collision avoidance predicting section 350 predicts that the change L3 similar to the change group Lg1 will change from the non-assistance region A1 to the assistance region A2 in the future. Accordingly, the collision avoidance predicting section 350 determines that there is a high probability that the collision avoidance assistance will be activated due to the fact that the estimated change L4 belongs to the assistance region A2, thereby suppressing activation of the lane keeping assistance.

In contrast, since the change L5 of the assistance target vehicle is similar to the change group Lg2, the collision avoidance predicting section 350 determines that there is a high probability that the change L5 will follow the change L6 similar to the change group Lg2. That is, since the change group Lg2, which is a statistical distribution of the first time TTC and the second time TTV, continues to belong to only the non-assistance region A1, the collision avoidance predicting section 350 predicts that the change L5 similar to the change group Lg2 will also continue to belong to the non-assistance region A1 in the future. Accordingly, the collision avoidance predicting section 350 determines that there is low probability that the collision avoidance assistance will be activated due to the fact that the estimated change L6 will not belong to the assistance region A2, thereby, permitting activation of the lane keeping assistance.

Figure 18:
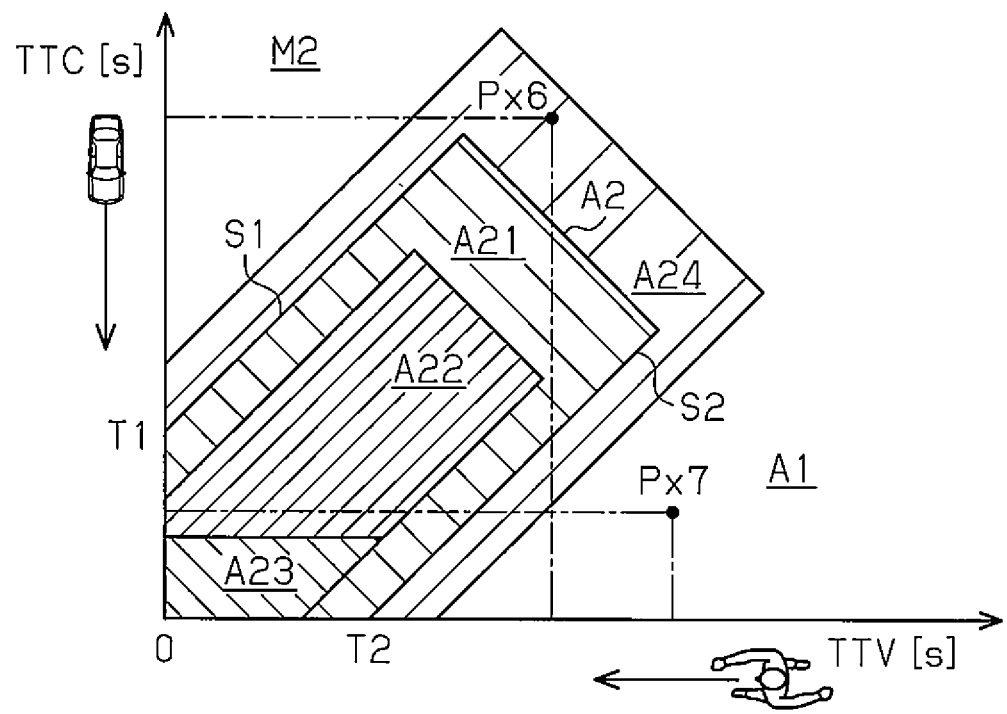
FIG. 18 is a diagram showing one example of a map used for prediction of an activation probability of collision avoidance assistance.

Further, as shown in FIG. 18, when an intersection point Px6 of the first time TTC and the second time TTV belongs to a predicted region A24 set up in a map M2 recorded, for example, in a map storage section 351, the collision avoidance predicting section 350 determines that there is a high probability that the collision avoidance assistance will be activated. Thus, the collision avoidance predicting section 350 suppresses activation of the lane keeping assistance.

The predicted region A24 is a region in which the assistance region A2 is extended and, for example, a region that is set up based on experiments or the like.

As also shown in FIG. 18, when, for example, an intersection point Px7 of the first time TTC and the second time TTV is positioned outside the assistance region A2 and the predicted range A24, the collision avoidance predicting section 350 determines that there is low probability that the collision avoidance assistance will be activated. Thus, the collision avoidance predicting section 350 permits activation of the lane keeping assistance.

The collision avoidance predicting section 350 predicts an activation probability of the collision avoidance assistance by using any one of the methods described in FIGS. 17A, 17B, and 18.

Further, in the present embodiment, when it is determined that there is a high probability that the collision avoidance assistance will be activated, the suppressing condition is determined to have been met.

Hereinafter, operation of the driving assistance apparatus and the driving assistance method of the present embodiment will be described with reference to FIG. 19.

Figure 19:
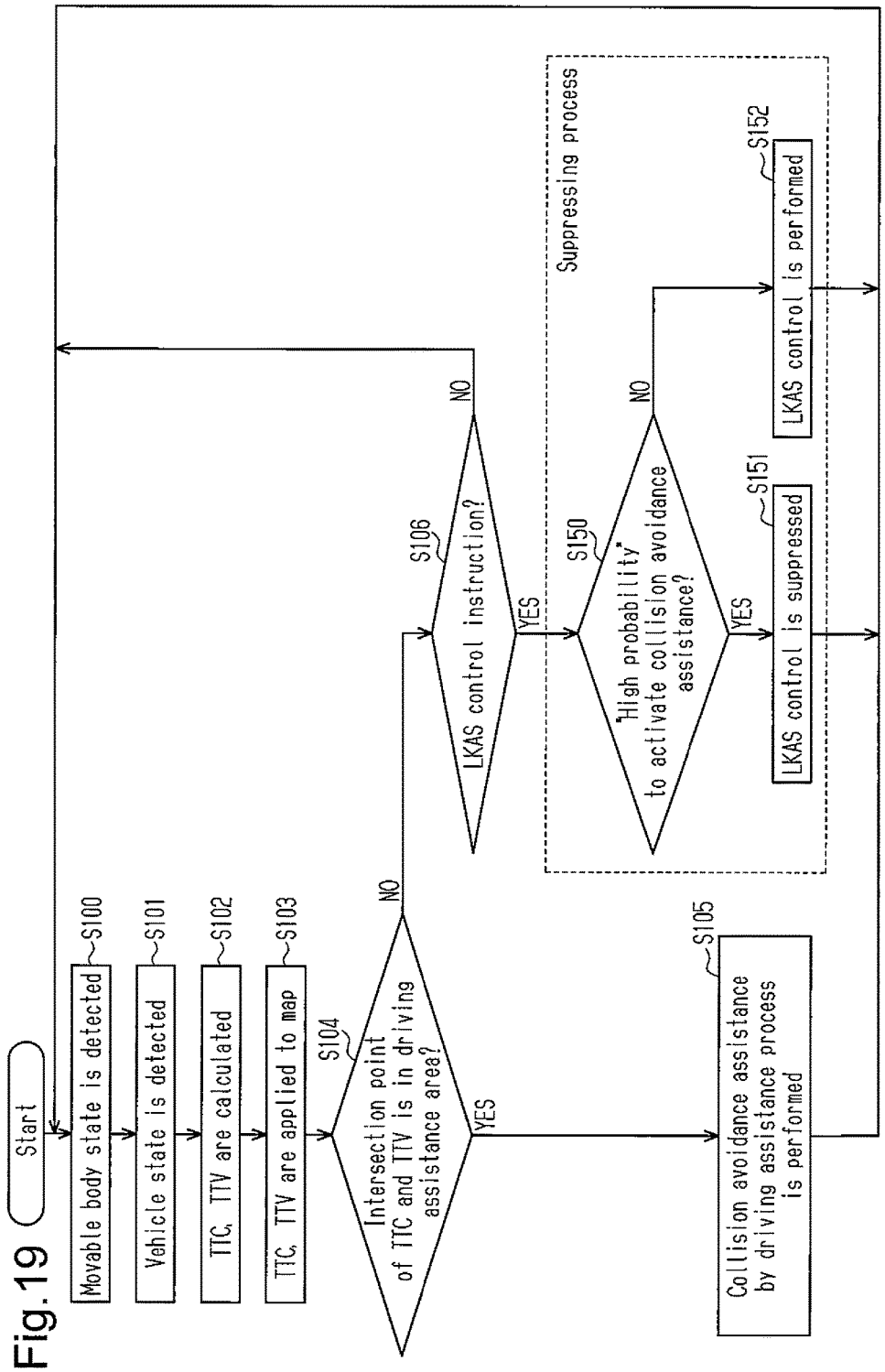
FIG. 19 is a flowchart showing one example of an arbitration process performed by a driving assistance apparatus and a driving assistance method according to another embodiment of the present invention.

As shown in FIG. 19, when a request for activating the lane keeping assistance is made in Step S106, the collision avoidance predicting section 350 predicts an activation probability of the collision avoidance assistance (Step S150). Then, when a result of prediction indicates that there is a high probability that the collision avoidance assistance will be activated (Step S150: YES), the collision avoidance predicting section 350 suppresses activation of the lane keeping assistance (Step S151).

In contrast, when the result of prediction indicates that there is low probability that the collision avoidance assistance will be activated, the collision avoidance predicting section 350 permits activation of the lane keeping assistance (Step S152).

As so far described, according to the driving assistance apparatus and the driving assistance method of the present embodiment, the advantages of (1) to (10) are obtained and the following advantages are also obtained.

(18) The assistance arbitration section 300C is provided with the collision avoidance predicting section 350, which predicts the activation probability of the collision avoidance assistance. Upon determination that there is a high probability that the collision avoidance assistance will be activated, the collision avoidance predicting section 350 suppresses activation of the lane keeping assistance. Therefore, even if no collision avoidance assistance has been activated and when activation of the collision avoidance assistance is predicted, activation of the lane keeping assistance is suppressed in advance. Accordingly, the lane keeping assistance is suppressed based on prediction to suppress the lane keeping assistance at an earlier stage.

Other Embodiments

The above described embodiments may be modified as follows.

In the above-described first embodiment, the timing changing section 310 causes a relative change in time of performance of the collision avoidance assistance and the lane keeping assistance by changing the time of performance of the lane keeping assistance. In addition thereto, it is acceptable that the timing changing section 310 causes a relative change in time of performance of the collision avoidance assistance and the lane keeping assistance by changing the time of performance of the collision avoidance assistance. It is also acceptable that the timing changing section 310 causes a relative change in time of performance of the collision avoidance assistance and the lane keeping assistance by changing the time of performance of the collision avoidance assistance and the lane keeping assistance.

In the above-described first embodiment, the assistance arbitration section 300 suppresses the lane keeping assistance as arbitration in a period of time from start of collision avoidance assistance to termination of the collision avoidance assistance. Further, the assistance arbitration section 300 suppresses the lane keeping assistance as arbitration until the lapse of the setup time from termination of the collision avoidance assistance. In addition thereto, it is acceptable that arbitration between the collision avoidance assistance and the lane keeping assistance may be performed by increasing a threshold value of deviation of a position of the lane from a position of a wheel of a vehicle that has been set in advance as a condition of activating the lane keeping assistance. Accordingly, arbitration is performed between the collision avoidance assistance and the lane keeping assistance by making difficult activation of the lane keeping assistance. Also, in the above-described second embodiment, when a certain control amount is specified to attain a predetermined threshold value as a condition of activating the skidding suppressing assistance and the autonomous travel assistance, it is acceptable that arbitration is made by increasing the threshold value.

In the above-described sixth embodiment, the collision avoidance predicting section 350 predicts an activation probability of collision avoidance assistance by using any one of the methods described in FIGS. 17A, 17B, and 18. It is also acceptable that the collision avoidance predicting section 350 predicts the activation probability of the collision avoidance assistance based on at least two methods described in FIGS. 17A, 17B, and 18. Accordingly, the collision avoidance predicting section 350 suppresses activation of the lane keeping assistance, for example, when the activation probability of the collision avoidance assistance is predicted to be high based on at least two results of these methods. Further, the collision avoidance predicting section 350 is able to permit activation of the lane keeping assistance, for example, when the activation probability of the collision avoidance assistance is predicted to be low based on at least two results of the methods. Thereby, the activation probability is predicted more strictly, thus making it possible to perform arbitration more accurately the collision avoidance assistance in relation to the lane keeping assistance.

In the above-described sixth embodiment, the collision avoidance predicting section 350 predicts an activation probability of the collision avoidance assistance based on the map stored at the map storage section 351. In addition thereto, it is acceptable that the collision avoidance predicting section 350 predicts the activation probability of the collision avoidance assistance by predetermined computation. It is also acceptable that the collision avoidance predicting section 350 learns an operation pattern of the driver of a vehicle that is an assistance target and predicts the activation probability of the collision avoidance assistance based on the learned operation pattern.

In the above-described sixth embodiment, when an activation probability of the collision avoidance assistance has been determined to be high, activation of driving assistance different from the collision avoidance assistance is suppressed. In addition thereto, as illustrated in FIGS. 7 and 9, when activation of the collision avoidance assistance is predicted because a vehicle that is an assistance target will change in state due to activation of the driving assistance different from the collision avoidance assistance, it is acceptable that activation of the driving assistance different from the collision avoidance assistance is suppressed by assuming that the suppressing condition has been met.

That is, when a vehicle state such as the advancing direction or the traveling speed is changed due to performance of driving assistance different in type from collision avoidance assistance, there is a fear that an object may be found ahead of the vehicle after the change in the advancing direction or in a predetermined range and the vehicle after the change may approach the object. At this time, there is a fear that the vehicle state may be changed by the driving assistance different from the collision avoidance assistance and a condition of activating the collision avoidance assistance, which has not been met at the beginning, will be met to activate the collision avoidance assistance. However, change in state of the assistance target vehicle due to activation of the driving assistance different from the collision avoidance assistance causes prediction of activation of the collision avoidance assistance to be specified as a suppressing condition of the driving assistance different from the collision avoidance assistance. Accordingly, activation of the driving assistance different in type from the collision avoidance assistance is suppressed. Therefore, it is possible to suppress in advance the driving assistance different in type from the collision avoidance assistance from being a cause of activation of the collision avoidance assistance.

Further, as shown in FIGS. 7 and 9, the state of the assistance target vehicle changes by activation of the driving assistance different from the collision avoidance assistance. Therefore, when it is predicted that the collision avoidance assistance will be activated again, activation of the driving assistance different from the collision avoidance assistance may be suppressed by assuming that the suppressing condition has been met. That is, when the collision avoidance assistance is different in target vehicle state from the driving assistance different from the collision avoidance assistance, there may be a case where a condition of activating the driving assistance different from the collision avoidance assistance is met depending on the vehicle state, which has been changed by the collision avoidance assistance. In contrast, when the driving assistance different from the collision avoidance assistance is performed on the activation condition, which has been met to result in a change in the vehicle state, there may be a case where the collision avoidance assistance may be again needed after the change in vehicle state. At this time, there is a fear that a plurality of types of driving assistance may be alternately performed in such modes as the collision avoidance assistance, the driving assistance different from the collision avoidance assistance and the collision avoidance assistance. However, a prediction that the collision avoidance assistance will be activated again due to activation of the driving assistance different from the collision avoidance assistance is specified as a suppressing condition. Thereby, activation of the driving assistance different from the collision avoidance assistance is suppressed when the collision avoidance assistance due to performance of the driving assistance different from the collision avoidance assistance is predicted to be activated again. As a result, it is possible to suppress in advance the activation of the collision avoidance assistance due to activation of the driving assistance different from the collision avoidance assistance. This prediction is made, for example, by estimation based on linear prediction or statistical distribution on whether an intersection point of the first time TTC and the second time TTV, which have been caused to exit the assistance region A2 by the collision avoidance assistance, belongs again to the assistance region A2 by the driving assistance different from the collision avoidance assistance.

Figure 20:
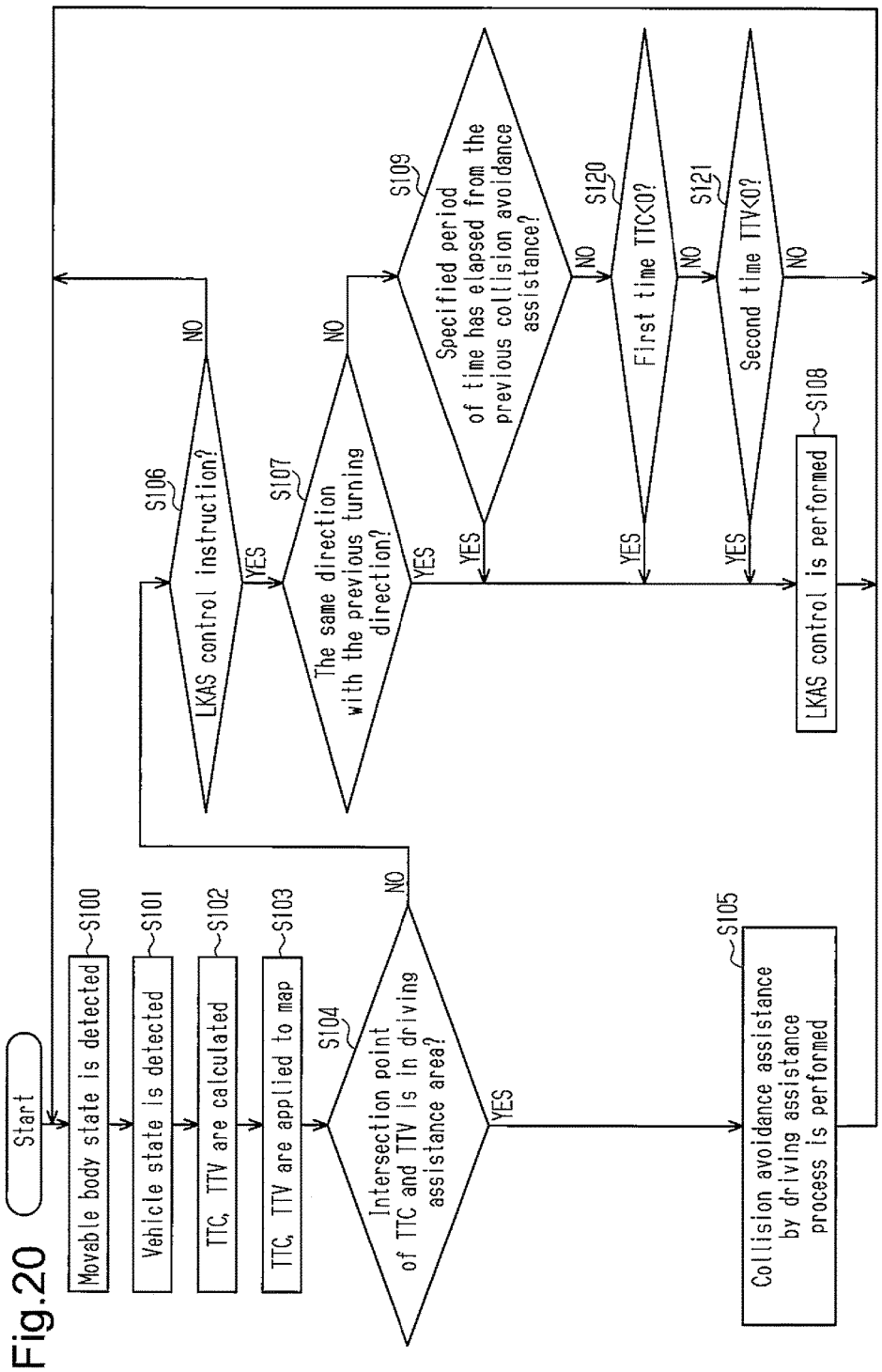
FIG. 20 is a flowchart showing one example of an arbitration process performed by a driving assistance apparatus and a driving assistance method according to another embodiment of the present invention.

In the above-described third embodiment, on condition that the value of the first time TTC or that of the second time TTV is less than 0, activation of the lane keeping assistance different in direction is permitted. In addition thereto, as shown in FIG. 20, which corresponds to FIG. 5, it is acceptable that it is determined in Step S109 whether a specified period of time has elapsed from termination of the previous collision avoidance assistance and, thereafter, it is determined whether the value of the first time TTC or that of the second time TTV is less than 0 after termination of the collision avoidance assistance (Step S120, S121). Accordingly, even if the first time TTC and the second time TTV are both greater than or equal to 0 but when a specified period of time has elapsed from termination of the previous collision avoidance assistance, activation of the lane keeping assistance is permitted (Step S109: YES, S108). Further, even when the specified period of time has not elapsed from termination of the previous collision avoidance assistance and when the value of the first time TTC or that of the second time TTV is less than 0, activation of the lane keeping assistance is permitted (Step S109: NO, S120, S121). Accordingly, the condition of activating the lane keeping assistance is reduced. In a situation where there is low probability to activate again the collision avoidance assistance, the lane keeping assistance is performed smoothly. Further, in addition thereto, it is acceptable that activation of the lane keeping assistance is permitted on condition that the value of the first time TTC and that of the second time TTV are both less than 0.

In the above-described third embodiment, in the period of time during which at least one of the first time TTC and the second time TTV is converted from a positive value to a negative value, the driving assistance different from the collision avoidance assistance has been suppressed. In addition thereto, it is acceptable that in the period of time during which at least one of the first time TTC and the second time TTV is converted from a decreasing change to an increasing change, the driving assistance different from the collision avoidance assistance is suppressed. In other words, on condition that at least one of the first time TTC and the second time TTV is converted from a decreasing change to an increasing change, there may be permitted activation of the driving assistance different from the collision avoidance assistance. Accordingly, for example, the assistance target vehicle or a movable body present in the vicinity thereof is changed in the advancing direction, by which at least one of the first time TTC and the second time TTV is converted from a decreasing change to an increasing change. Thereby, when at least one of the first time TTC and the second time TTV is converted from a decreasing change to an increasing change, activation of the driving assistance different from the collision avoidance assistance is permitted by assuming that there is low probability that the collision avoidance assistance is activated. Accordingly, when there is low probability that the collision avoidance assistance is activated, the driving assistance different from the collision avoidance assistance is performed before the lapse of a specified period of time. And, assistance effects of the driving assistance different from the collision avoidance assistance are favorably maintained.

Figure 21:
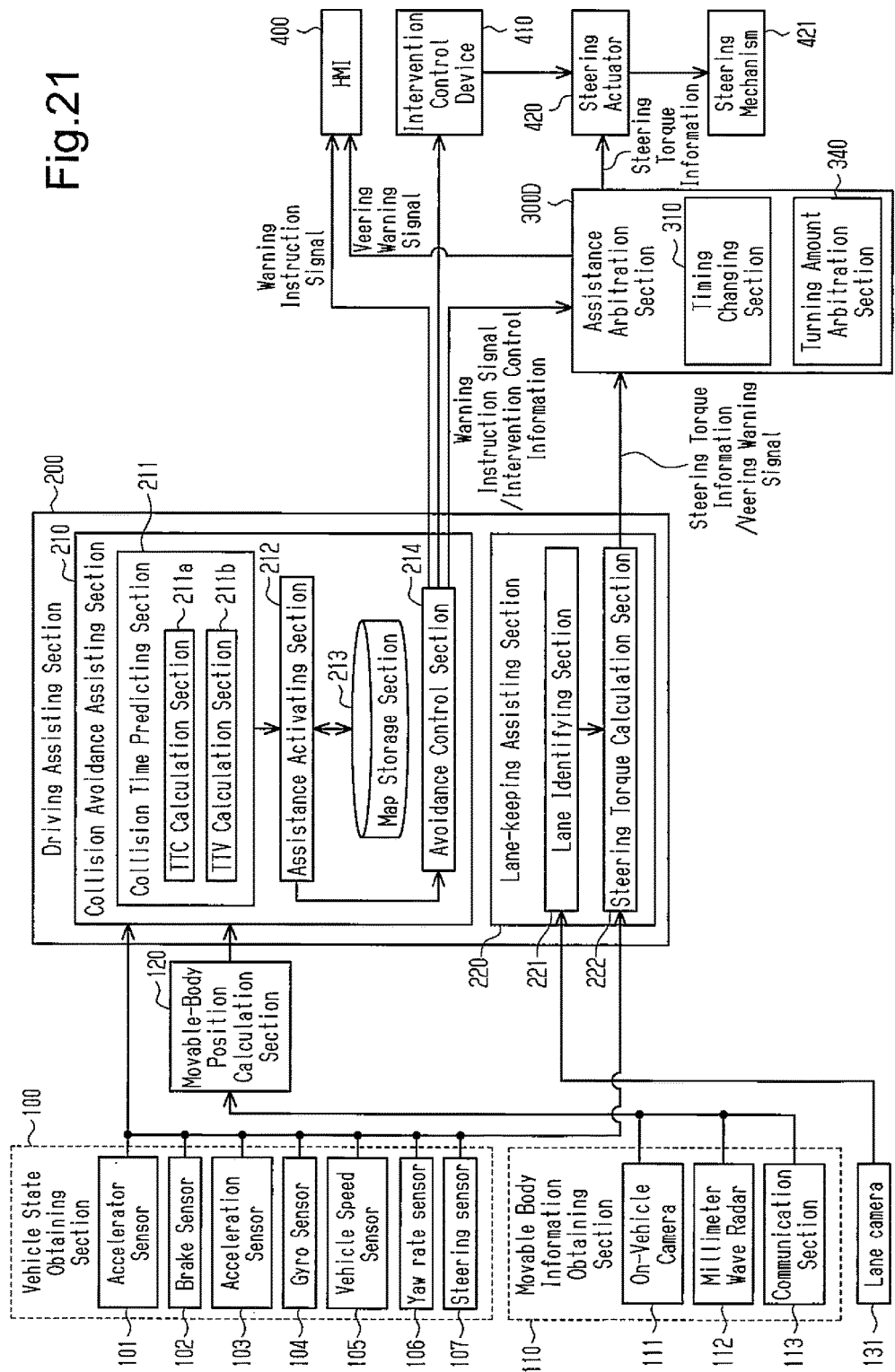
FIG. 21 is a block diagram showing a schematic configuration of a vehicle to which a driving assistance apparatus and a driving assistance method of another embodiment of the present invention are applied.
Figure 22:
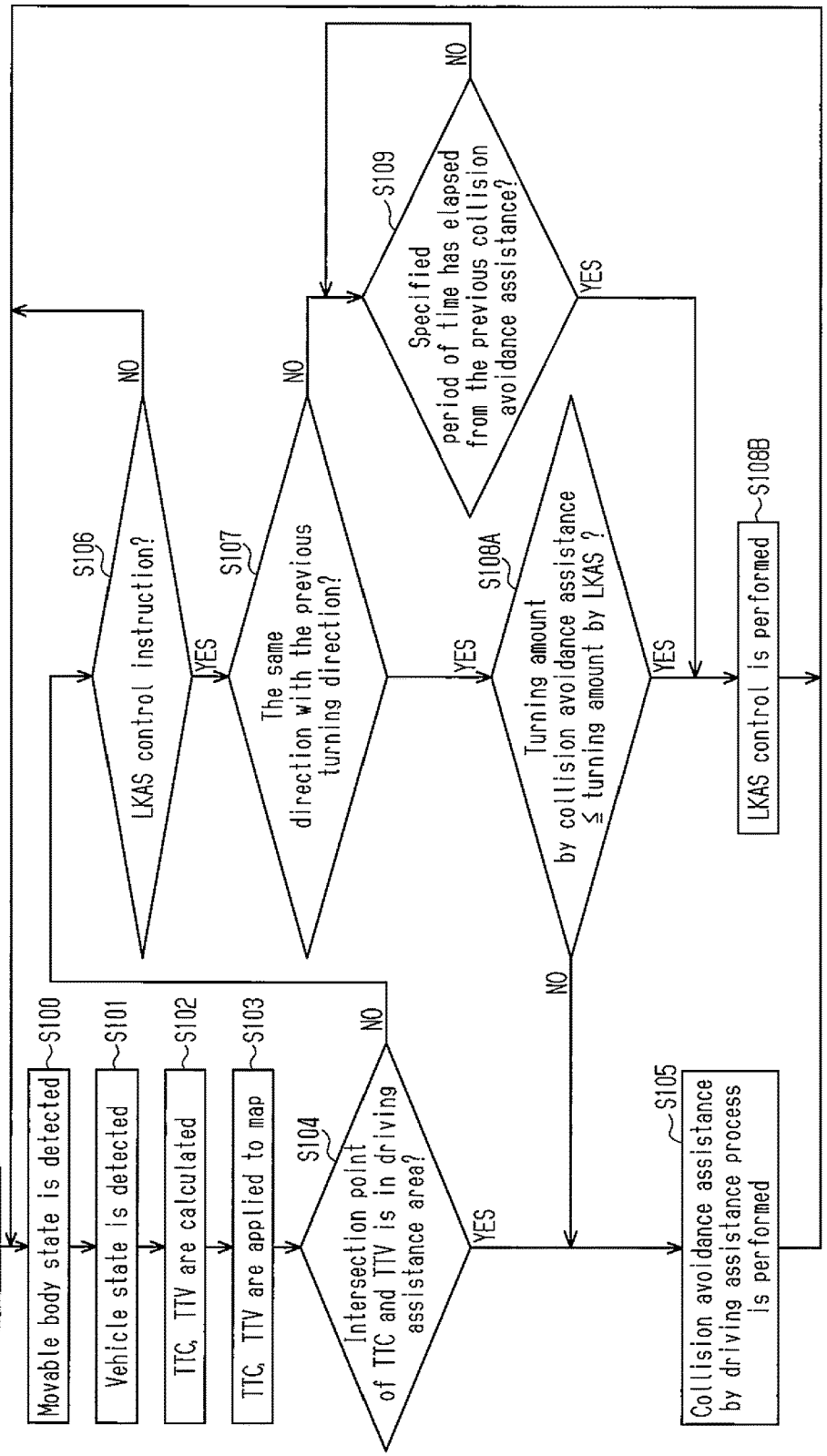
FIG. 22 is a flowchart showing one example of an arbitration process performed by a driving assistance apparatus and a driving assistance method according to another embodiment of the present invention.

In each of the above-described embodiments, when the turning direction of the collision avoidance assistance is the same as that of the assistance other than the collision avoidance assistance, performance of the assistance other than the collision avoidance assistance is permitted. In addition thereto, as illustrated in FIG. 21, it is acceptable that the assistance arbitration section 300D is also provided with the turning amount arbitration section 340 which arbitrates a control amount of the same turning direction. Thereby, as shown, for example, in FIG. 22 corresponding to FIG. 5, when the turning direction of collision avoidance assistance is the same as that of the assistance other than the collision avoidance assistance (Step S107: YES), the turning amount arbitration section 340 compares the turning amounts of these types of assistance (Step S108A). Moreover, when the turning amount by lane keeping assistance is greater than the turning amount by the collision avoidance assistance (Step S108A: YES), the turning amount arbitration section 340 permits only activation of the assistance based on the turning amount by the lane keeping assistance (Step S108B). Further, when the turning amount by the lane keeping assistance is less than the turning amount by the collision avoidance assistance (Step S108A: NO), the turning amount arbitration section 340 permits activation of the collision avoidance assistance, while suppressing activation of the lane keeping assistance (Step S105). Accordingly, unnecessarily turning in the same direction is suppressed so that driving assistance is performed more appropriately. Further, such assistance that has a maximum turning amount is selected to satisfy any turning amount which is required in these types of assistance in terms of the collision avoidance assistance and the lane keeping assistance. It is also acceptable that the assistance arbitration section 300D not only arbitrates between the collision avoidance assistance in relation to the lane keeping assistance but also arbitrates between two of the collision avoidance assistance, the lane keeping assistance, the skidding suppressing assistance and the autonomous travel assistance.

In each of the above-described embodiments, the vehicle state obtaining section 100 is configured by the accelerator sensor 101, the brake sensor 102, the acceleration sensor 103, the gyro sensor 104, the vehicle speed sensor 105, the yaw rate sensor 106, the steering sensor 107, and the like. In addition thereto, it is acceptable that the vehicle state obtaining section 100 is configured by at least any one of the accelerator sensor 101, the brake sensor 102, the acceleration sensor 103, the gyro sensor 104, the vehicle speed sensor 105, the yaw rate sensor 106 and the steering sensor 107. Then, it is acceptable that the first time TTC is calculated through computation based on a result detected by at least one of the sensors. It is also acceptable that the vehicle state obtaining section 100 is configured by a GPS which detects the latitude/longitude of the assistance target vehicle. Thereby, based on the latitude/longitude of the vehicle detected by the GPS, the traveling speed of the vehicle is calculated and the first time TTC is calculated. In addition, the vehicle state obtaining section 100 may include any section that is able to obtain information that can be used in calculating the first time TTC.

In each of the above-described embodiments, the movable body information obtaining section 110 has been configured by the on-vehicle camera 111, the millimeter wave radar 112 and the communication apparatus 113. In addition thereto, it is acceptable that the movable body information obtaining section 110 is configured by at least any one of the on-vehicle camera 111, the millimeter wave radar 112 and the communication apparatus 113. Further, the movable body information obtaining section 110 may be configured by any section which is able to obtain information on a movable body that can be used in calculating the second time TTV.

In each of the above-described embodiments, the assistance region A2 in the map M illustrated in FIGS. 3 and 4 is divided into the HMI area A21, the intervention control area A22 and the emergency intervention control area A23. It is acceptable that the assistance region A2 is further divided into 4 or more areas and a driving assistance mode is set up for each of the thus divided areas. It is also acceptable that the assistance region A2 is specified by one or two regions and various types of driving assistance modes are set up in the thus specified regions. When the assistance region A2 to be divided is configured only by the HMI area, the above-described intervention control device 410 may be omitted. In contrast, when the assistance region A2 to be divided is configured only by the intervention control area A22 or only by the emergency intervention control area A23, the above-described HMI 400 is omitted. Further, the driving assistance set up in the assistance region A2 may be provided in any mode and can be changed whenever necessary.

In each of the above-described embodiments, the collision avoidance assistance is performed based on the map M stored at the map storage section 213. In addition thereto, any collision avoidance assistance will do, as long as it is performed based on a relative relationship between the first time TTC and the second time TTV. It is also acceptable that success or failure of a condition of activating the collision avoidance assistance is determined depending on whether each value of the first time TTC and the second time TTV is equivalent to a specified value.

In each of the above-described embodiments, the collision avoidance assistance is performed based on the first time TTC and the second time TTV. In addition thereto, it is acceptable that the collision avoidance assistance is performed only based on the first time TTC. It is also acceptable that the collision avoidance assistance is performed only on condition that, for example, the distance between the assistance target vehicle and an object present in the vicinity thereof becomes equal to or less than a predetermined distance. That is, the collision avoidance assistance may include any assistance as long as it avoids approach of the vehicle to an object present in the vicinity thereof or collision between them. An assistance mode thereof and a condition of activation may be changed whenever necessary.

In each of the above-described embodiments, as an example in which the movement path of the vehicle intersects with the movement path of a movable body, there is estimated time when the movement paths intersect with each other. Then, the collision avoidance assistance has been performed based on the first time TTC and the second time TTV, which show their movement paths. In addition thereto, each of the movement paths used in the collision avoidance assistance may include any paths that intersect at the same site. The intersecting angle may include an angle less than 90° or an angle in excess of 90°.

In each of the above-described embodiments, as an avoidance target for avoiding collision with the assistant target vehicle, there is selected a pedestrian Tg. In addition thereto, as an avoidance target for avoiding collision with the vehicle, a movable body such as another vehicle present in the vicinity of the assistance target vehicle and an obstacle such as a guard rail may be selected. Besides, as an avoidance target for avoiding collision with the assistance target vehicle, any object will do as long as the object can be predicted for a physical collision with the assistance target vehicle.

In each of the above-described first embodiment and the third to sixth embodiments, arbitration is performed between the collision avoidance assistance and the lane keeping assistance. Further, in the above-described second embodiment, arbitration is performed between the collision avoidance assistance, the lane keeping assistance, the skidding suppressing assistance, and the autonomous travel assistance. In addition thereto, a combined mode of these types of assistance may be changed whenever necessary. Further, an assistance element may include any element that performs driving assistance for assisting in driving a vehicle and can be changed whenever necessary.

In each of the above-described embodiments, arbitration is performed between types of assistance performed by the HMI 400, the steering actuator 420, and the like. In addition thereto, arbitration may be performed for assistance that is performed only by the HMI 400 or only by the steering actuator 420. Besides, an assistance element used in driving assistance is not restricted to the HMI 400 and the steering actuator 420 but may include anything that prompts the driver to realize a target vehicle state and control of the vehicle to change the vehicle in the target vehicle state.

Figure 23:
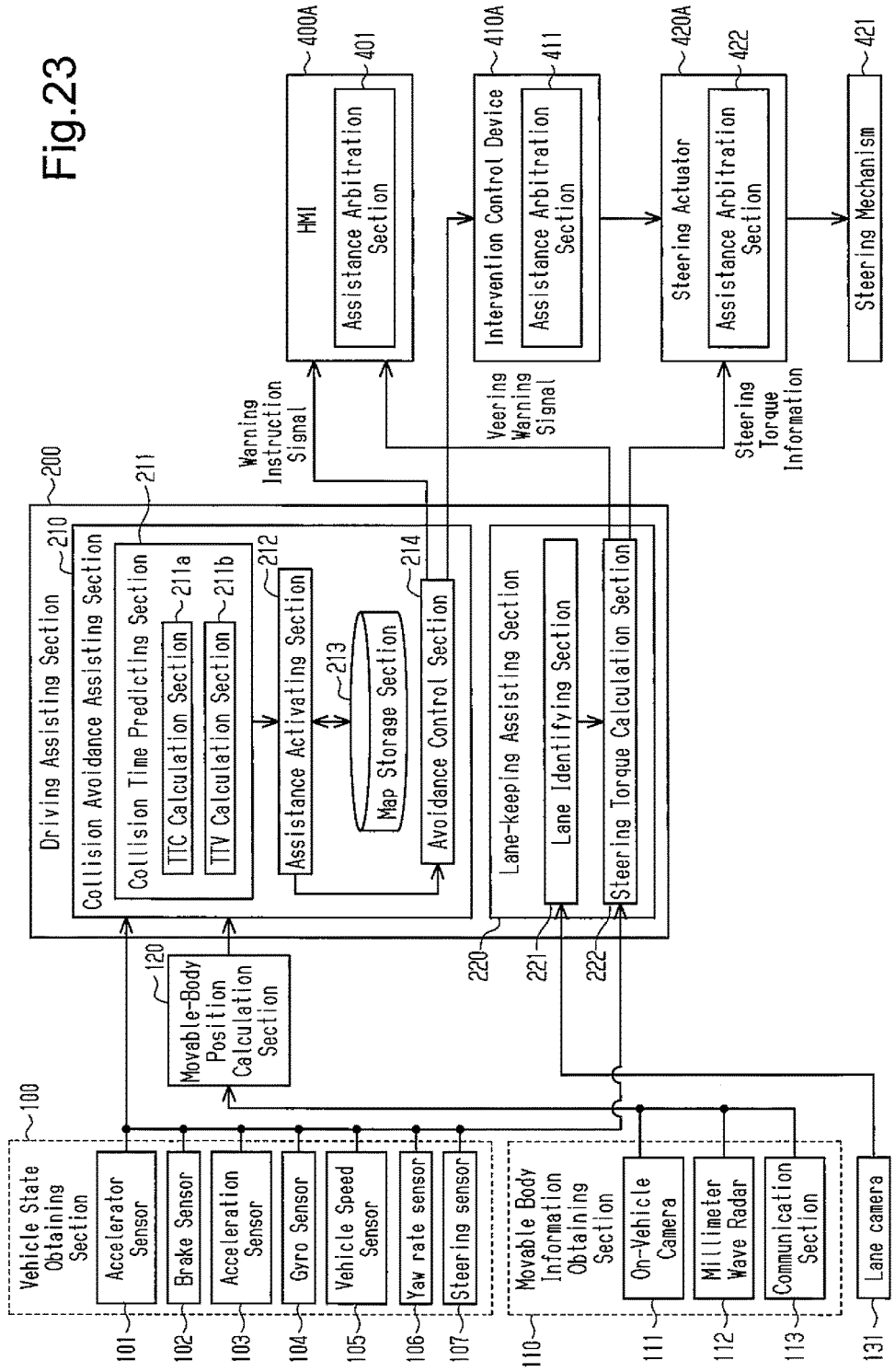
FIG. 23 is a block diagram showing a schematic configuration of a vehicle to which a driving assistance apparatus and a driving assistance method of another embodiment of the present invention are applied.

In each of the above-described embodiments, the assistance arbitration section 300 is configured separately from the HMI 400, the intervention control device 410 and the steering actuator 420. In addition thereto, as shown in FIG. 23 corresponding to FIG. 1, it is acceptable that the HMI 400A, the intervention control device 410A and the steering actuator 420A are configured to have assistance arbitration sections 401, 411, 422 with functions similar to those of the assistance arbitration section 300. Accordingly, even if a request for activating a plurality of types of driving assistance is made by the driving assisting section 200, the HMI 400A and the intervention control device 410A are able to independently arbitrate the plurality of types of driving assistance. Further, a site at which the assistance arbitration section is placed can be changed whenever necessary. The assistance arbitration section may be installed, for example, on the driving assisting sections 200, 200B, 200C, and the like.

In each of the above-described embodiments, sound guidance and image guidance by the HMI 400 are used in performing assistance for prompting the driver to make a turning. Further, in each of the above-described embodiments, the intervention control device 410 is used to cause vibration to the steering system or apply a steering torque to the steering system, thereby performing assistance for prompting turning. It is also acceptable that light for notifying the driver of prompted turning is emitted to the interior of a vehicle or vibration for notifying the driver of prompted turning is given to the seat, steering system, and the like, to prompt turning, thereby performing assistance for prompting turning.

Figure 24:
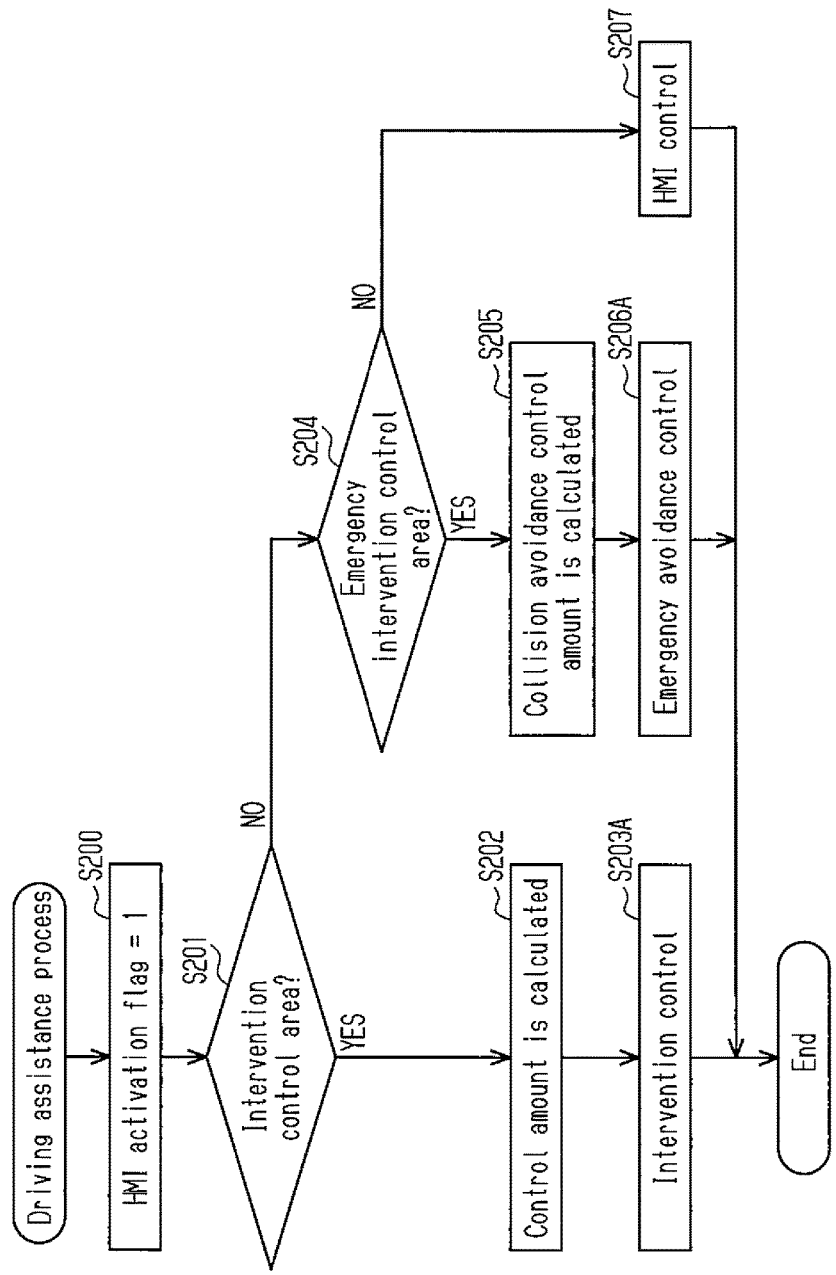
FIG. 24 is a flowchart showing one example of a driving assistance process performed by a driving assistance apparatus and a driving assistance method according to another embodiment of the present invention.

In each of the above-described embodiments, as shown in Steps S203, S206 of FIG. 6, HMI control by the HMI 400 is also performed upon performance of intervention control or emergency intervention control. In addition thereto, as shown in FIG. 24 as a drawing corresponding to FIG. 6, when conditions of performing the intervention control are met, only intervention control may be performed (Step S203A). Further, when conditions of performing the emergency intervention control are met, only emergency intervention control may be performed (Step S206A).

In each of the above-described embodiments, various types of assistance for prompting turning are arbitration targets. It is also acceptable that turning by the collision avoidance assistance and deceleration or acceleration by the lane keeping assistance, the skidding suppressing assistance and the autonomous travel assistance are arbitration targets.

In each of the above-described embodiments, as driving assistance different in type from the collision avoidance assistance, driving assistance for prompting the assistance target vehicle to make turning is selected. In addition thereto, as the driving assistance different in type from the collision avoidance assistance may include assistance in which acceleration and deceleration of the vehicle are prompted by sound, images and braking.

In each of the above-described embodiments, the driving assisting section 200 and the assistance arbitration section 300 are mounted on the vehicle. In addition thereto, the driving assisting section 200 and the assistance arbitration section 300 may be configured by, for example, application programs installed in a multifunction phone such as a smart phone. Accordingly, the multifunction phone determines whether a suppression condition is met based on map information retained at the multifunction phone and traffic information, which can be obtained via the Internet or the like. The multifunction phone performs driving assistance via, for example, voice guidance and picture guidance. Thereby, even a vehicle with no navigation system can be given driving assistance in an appropriate manner. Further, the multifunction phone is great in versatility. Therefore, it is able to appropriately perform driving assistance for more situations. In general, the multifunction phone is often provided with a GPS and map information. Therefore, based on latitude/longitude information and the map information obtained by the GPS, it is possible to identify a position of the assistance target vehicle and also to identify traveling environments of the assistance target vehicle. Then, based on the position of the vehicle and the traveling environments that can be identified, it is possible to calculate the first time TTC and the second time TTV. Further, the multifunction phone is used by many users. Therefore, the driving assisting section 200 and an assistance suppressing section 150 are installed on the multifunction phone, thus making it possible to realize appropriate driving assistance in many situations.

In each of the above-described embodiments, in order to arbitrate between the collision avoidance assistance and other types of driving assistance, activation of the other types of driving assistance has been suppressed. In addition thereto, it is acceptable that the priority of the collision avoidance assistance and the priority of the other types of driving assistance are determined based on driving environments of the vehicle and the control amounts used in various types of assistance. Then, it is acceptable that activation of assistance that has been determined to be low in priority is suppressed. Accordingly, when a request for activating a plurality of types of driving assistance is made, driving assistance higher in priority is preferentially performed. Thereby, it is possible to perform driving assistance properly corresponding to traveling environments.

In each of the above-described embodiments, arbitration has been performed to suppress activation of the driving assistance different in type from the collision avoidance assistance. In addition thereto, it is acceptable that the driving assistance suppressed by arbitration includes the collision avoidance assistance.

DESCRIPTION OF THE REFERENCE NUMERALS

100 . . . Vehicle state obtaining section, 101 . . . Accelerator sensor, 102 . . . Brake sensor, 103 . . . Acceleration sensor, 104 . . . Gyro sensor, 105 . . . Vehicle speed sensor, 106 . . . Yaw rate sensor, 107 . . . Steering sensor, 110 . . . Movable body information obtaining section, 111 . . . On-vehicle camera, 112 . . . Millimeter wave radar, 113 . . . Communication apparatus, 120 . . . Movable-body position calculating section, 131 . . . Lane camera, 150 . . . Assistance suppressing section, 200, 200A, 200B, 200C . . . Driving assisting section, 210 . . . Collision avoidance assisting section, 211 . . . Collision time predicting section, 211a . . . TTC calculation section, 211b . . . TTV calculation section, 212 . . . Assistance activating section, 213 . . . Map storage section, 214 . . . Avoidance control section, 220 . . . Lane-keeping assisting section, 221 . . . Lane identifying section, 222 . . . Steering torque calculation section, 230 . . . Suppressing section, 231 . . . Skidding determination section, 232 . . . Control amount calculation section, 240 . . . Autonomous travel assisting section, 300, 300A, 300B, 300C, 300D . . . Assistance arbitration section, 310 . . . Timing changing section, 320 . . . Control amount reducing section, 330 . . . Assistance suppressing section, 340 . . . Turning amount arbitration section, 350 . . . Collision avoidance predicting section, 351 . . . Map storage section, 400, 400A . . . HMI, 401 . . . Assistance arbitration section, 410, 410A . . . Intervention control device, 411 . . . Assistance arbitration section, 420, 420A . . . Steering actuator, 421 . . . Steering mechanism, 422 . . . Assistance arbitration section, Po . . . Meeting point of movement path of vehicle which is assistance target and movement path of object which is avoidance target, SC . . . Street crossing, SG . . . Signal generator, Tg . . . Pedestrian, A21 . . . HMI area, A22 . . . Intervention control area, A23 . . . Emergency intervention control area, A24 . . . Predicted region of collision avoidance assistance.

The invention claimed is:

1. A driving assistance apparatus that assists in driving a vehicle, comprising:
   a collision avoidance assisting section configured to perform collision avoidance assistance for avoiding a collision between a vehicle that is an assistance target and an object by prompting turning of the vehicle; and
   an assistance arbitration section configured to perform arbitration between the collision avoidance assistance and driving assistance different in type from the collision avoidance assistance, wherein
   when a request for activating the driving assistance different in type from the collision avoidance assistance is detected after termination of performance of the collision avoidance assistance, and the driving assistance different in type from the collision avoidance assistance prompts turning of the vehicle in a direction conflicting with a turning direction previously prompted by the collision avoidance assistance, the assistance arbitration section performs, as the arbitration, a reduction process for reducing an assistance amount of the driving assistance different in type from the collision avoidance assistance, wherein the driving assistance different in type from the collision avoidance assistance comprises steering control of the vehicle, wherein the assistance arbitration section is further configured to suppress repeated performance of the driving assistance different in type from the collision avoidance assistance within a period of time after termination of performance of the collision avoidance assistance by performing the reduction process.

2. The driving assistance apparatus according to claim 1, wherein the assistance arbitration section is further configured to suppress the driving assistance different in type from the collision avoidance assistance during at least one of the following additional periods of time:

a period of time from start of the collision avoidance assistance to termination of the collision avoidance assistance;

a period of time during which a suppressing condition specified for the driving assistance different in type from the collision avoidance assistance is met.

3. The driving assistance apparatus according to claim 2, wherein the suppressing condition is met based on a prediction that collision avoidance assistance will be activated again.

4. The driving assistance apparatus according to claim 3, wherein the collision avoidance assistance includes assistance for performing intervention braking to the vehicle, and the collision avoidance assisting section is further configured to provide the collision avoidance assistance if an activation condition including performance of the driving assistance different in type from the collision avoidance assistance is at least one of assistance for performing intervention braking, and assistance for prompting the turning of the vehicle.

5. The driving assistance apparatus according to claim 2, wherein the suppressing condition is met based on a prediction that the collision avoidance assistance will be activated again due to performance of the driving assistance different in type from the collision avoidance assistance after termination of the collision avoidance assistance.

6. The driving assistance apparatus according to claim 1, wherein the driving assistance different in type from the collision avoidance assistance further comprises at least one of:

lane-keeping travel assistance for prompting the vehicle to be maintained at a traveling position within a lane;

skidding suppressing assistance for assisting the vehicle in suppressing skidding; and autonomous travel assistance for assisting the vehicle in traveling autonomously.

7. A driving assistance apparatus that assists in driving a vehicle, including:

a collision avoidance assisting section configured to perform collision avoidance assistance for avoiding a collision between a vehicle that is an assistance target and an object by prompting turning of the vehicle; and an assistance arbitration section configured to perform arbitration between the collision avoidance assistance and driving assistance different in type from the collision avoidance assistance, wherein the driving assistance different in type from the collision avoidance assistance is driving assistance for prompting turning of the vehicle, and the assistance arbitration section is configured to suppress the driving assistance different in type from the collision avoidance assistance when the collision avoidance assistance and the driving assistance different in type from the collision avoidance assistance prompt turning in conflicting directions, wherein the object is a movable body, and based on a relationship between a first time taken by the vehicle to reach a meeting point where the vehicle meets the movable body and a second time taken by the movable body to reach the meeting point, the collision avoidance assisting section assists in avoidance of collision between the vehicle and the movable body.

8. The driving assistance apparatus according to claim 7, wherein, when a request for activating the driving assistance different from the collision avoidance assistance is detected during performance of the collision avoidance assistance or when a request for activating the driving assistance different from the collision avoidance assistance is detected after termination of performance of the collision avoidance assistance but before a lapse of a setup time, the assistance arbitration section suppresses the driving assistance different from the collision avoidance assistance in a period of time during which at least one of the first time and the second time is converted from a positive value to a negative value.

9. The driving assistance apparatus according to claim 7, wherein the collision avoidance assisting section has a map in which an assistance region of performing driving assistance and non-assistance region of performing no driving assistance are specified with respect to a relative relationship between the first time and the second time, and the collision avoidance assisting section performs the collision avoiding assistance by referring to the map.

10. A driving assistance method for assisting in driving a vehicle, performed by a driving assistance apparatus, comprising:

by a collision avoidance assisting section of the driving assistance apparatus, performing collision avoidance assistance for avoiding a collision between a vehicle that is an assistance target and an object; and by an assistance arbitration section of the driving assistance apparatus, performing arbitration between the collision avoidance assistance and driving assistance different in type from the collision avoidance assistance, wherein the driving assistance different in type from the collision avoidance assistance includes driving assistance for prompting turning of the vehicle, and detecting a request for activating the driving assistance different from the collision avoidance assistance after termination of performance of the collision avoidance assistance, in a case where the driving assistance different in type from the collision avoidance assistance prompts turning of the vehicle in a direction conflicting with a turning direction previously prompted by the collision avoidance assistance, by the assistance arbitration section, performing, as the arbitration, a reduction process for reducing an assistance amount of the driving assistance different in type from the collision avoidance assistance, wherein the driving assistance different in type from the collision avoidance assistance comprises steering control of the vehicle, wherein the reduction process also suppresses repeated performance of the driving assistance different in type from the collision avoidance assistance within a period of time after termination of performance of the collision avoidance assistance.

11. A multifunction phone that assists in driving a vehicle, comprising one or more of Electronic Control Units (ECUs), including:
   collision avoidance assisting circuitry, which performs collision avoidance assistance for avoiding a collision between a vehicle that is an assistance target and an object by prompting turning of the vehicle; and
   assistance arbitration circuitry, which performs arbitration between the collision avoidance assistance and driving assistance different in type from the collision avoidance assistance, wherein
   when a request for activating the driving assistance different from the collision avoidance assistance is detected after termination of performance of the collision avoidance assistance, and the driving assistance different in type from the collision avoidance assistance prompts turning of the vehicle in a direction conflicting with a turning direction previously prompted by the collision avoidance assistance, the assistance arbitration circuitry performs, as the arbitration,
   a reduction process for reducing an assistance amount of the driving assistance different in type from the collision avoidance assistance,
   wherein the driving assistance different in type from the collision avoidance assistance comprises steering control of the vehicle,
   wherein the assistance arbitration circuitry is further configured to suppress repeated performance of the driving assistance different in type from the collision avoidance assistance within a period of time after termination of performance of the collision avoidance assistance by performing the reduction process.

12. A driving assistance apparatus that assists in driving a vehicle, comprising one or more of Electronic Control Units (ECUs), including:
   collision avoidance assisting circuitry configured to perform collision avoidance assistance for avoiding a collision between a vehicle that is an assistance target and an object by prompting turning of the vehicle; and
   assistance arbitration circuitry configured to perform arbitration between the collision avoidance assistance and driving assistance different in type from the collision avoidance assistance, wherein
   when a request for activating the driving assistance different from the collision avoidance assistance is detected after termination of performance of the collision avoidance assistance, and the driving assistance different in type from the collision avoidance assistance prompts turning of the vehicle in a direction conflicting with a turning direction previously prompted by the collision avoidance assistance, the assistance arbitration circuitry performs, as the arbitration, a reduction process for reducing an assistance amount of the driving assistance different in type from the collision avoidance assistance,
   wherein the driving assistance different in type from the collision avoidance assistance comprises steering control of the vehicle,
   wherein the assistance arbitration circuitry is further configured to suppress repeated performance of the driving assistance different in type from the collision avoidance assistance within a period of time after termination of performance of the collision avoidance assistance by performing the reduction process.

13. A driving assistance apparatus that assists in driving a vehicle, comprising one or more of Electronic Control Units (ECUs), including:
   collision avoidance assisting circuitry, which performs collision avoidance assistance for avoiding collision between a vehicle that is an assistance target and an object by prompting turning of the vehicle; and
   assistance arbitration circuitry, which performs arbitration between the collision avoidance assistance and driving assistance different in type from the collision avoidance assistance, wherein
   the driving assistance different in type from the collision avoidance assistance is driving assistance for prompting turning of the vehicle, and
   the assistance arbitration circuitry suppresses the driving assistance different in type from the collision avoidance assistance when the collision avoidance assistance and the driving assistance different in type from the collision avoidance assistance prompt turning in conflicting directions, wherein
   the object is a movable body, and
   based on a relationship between a first time taken by the vehicle to reach a meeting point where the vehicle meets the movable body and a second time taken by the movable body to reach the meeting point, the collision avoidance assisting circuitry assists in avoidance of collision between the vehicle and the movable body.

14. A driving assistance method for assisting in driving a vehicle performed by a driving assistance apparatus including one or more Electronic Control Units (ECUs), comprising:
   by collision avoidance assisting circuitry of the ECUs, performing collision avoidance assistance for avoiding a collision between a vehicle that is an assistance target and an object; and
   by assistance arbitration circuitry of the ECUs, performing arbitration between the collision avoidance assistance and driving assistance different in type from the collision avoidance assistance, wherein the driving assistance different in type from the collision avoidance assistance includes driving assistance for prompting turning of the vehicle, and
   detecting a request for activating the driving assistance different from the collision avoidance assistance after termination of performance of the collision avoidance assistance, in a case where the driving assistance different in type from the collision avoidance assistance prompts turning of the vehicle in a direction conflicting with a turning direction previously prompted by the collision avoidance assistance,
   by the assistance arbitration circuitry, performing, as the arbitration, a reduction process for reducing an assistance amount of the driving assistance different in type from the collision avoidance assistance, wherein the driving assistance different in type from the collision avoidance assistance comprises steering control of the vehicle,
   wherein the reduction process also suppresses repeated performance of the driving assistance different in type from the collision avoidance assistance within a period of time after termination of performance of the collision avoidance assistance.

* * * * *